(12) United States Patent  
Ryder et al.

(10) Patent No.: US 7,806,944 B2  
(45) Date of Patent: *Oct. 5, 2010

(54) FUEL COMPOSITIONS COMPRISING TETRAMETHYLCYCLOHEXANE

(75) Inventors: Jason A. Ryder, Oakland, CA (US); Karl Fisher, Petaluma, CA (US)

(73) Assignee: Amyris Biotechnologies, Inc., Emeryville, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/175,465

(22) Filed: Jul. 18, 2008

(65) Prior Publication Data

US 2009/0020089 A1 Jan. 22, 2009

Related U.S. Application Data

(60) Provisional application No. 60/950,879, filed on Jul. 20, 2007.

(51) Int. Cl.  
*C10L 1/16* (2006.01)

(52) U.S. Cl. ............ 44/300; 208/15; 208/16; 585/14; 123/1 A

(58) Field of Classification Search ............ 44/300; 585/14; 208/15, 16  
See application file for complete search history.

(56) References Cited

U.S. PATENT DOCUMENTS

| | | | |
|---|---|---|---|
| 3,161,016 A | 12/1964 | Smith et al. | |
| 3,219,715 A | 11/1965 | Schneider | |
| 3,898,959 A | 8/1975 | Chen et al. | |
| 4,482,772 A | 11/1984 | Tabak | |
| 4,560,537 A | 12/1985 | Tabak | |
| 7,045,488 B2 | 5/2006 | Bartley et al. | |
| 7,186,855 B2 | 3/2007 | Cundy et al. | |
| 7,540,888 B2 * | 6/2009 | Ryder et al. | 44/451 |
| 2003/0014911 A1 | 1/2003 | Gunnerman | |
| 2003/0040650 A1 | 2/2003 | Bultler et al. | |
| 2003/0051988 A1 | 3/2003 | Gunnerman et al. | |
| 2004/0074760 A1 | 4/2004 | Portnoff et al. | |

FOREIGN PATENT DOCUMENTS

| | | |
|---|---|---|
| EP | 1391496 | 2/2004 |
| EP | 994088 | 6/2004 |
| GB | 881630 | 11/1961 |
| GB | 2211756 | 7/1989 |
| JP | 09059677 | 3/1997 |
| WO | WO 01/21738 | 3/2001 |
| WO | WO 02/100347 | 12/2002 |

(Continued)

OTHER PUBLICATIONS

Stanislaus et al., "Vapor Phase Catalytic Transformatiions of Terpene Hydrocarbons in the C10 H16 Series", Canadian Journal of Chemistry, vol. 50, pp. 113-118 (1972).

(Continued)

*Primary Examiner*—Ellen M McAvoy  
(74) *Attorney, Agent, or Firm*—Jones Day

(57) ABSTRACT

A fuel composition comprises at least a tetramethylcyclohexane and a fuel component. The tetramethylcyclohexane can be used as a fuel component or as a fuel additive in the fuel composition. The fuel composition may further comprise a conventional fuel component selected from a petroleum-based fuel component such as diesel fuel, jet fuel, kerosene or gasoline; or a coal-based fuel component. Methods of making and using the fuel composition are also disclosed.

52 Claims, 6 Drawing Sheets

AMG-500 / CARBOB Blend Distillation Curves (Temp = °C)

CARBOB Gasoline sourced from BP, Carson Refinery, CA

AMG-500 / CARBOB Blend Distillation Curves (Temp = °F)

CARBOB Gasoline sourced from BP, Carson Refinery, CA

OTHER PUBLICATIONS

Yabuta, Hikaru, Detection of mono- and bicyclic alkanes and their characteristics in Neogene sediments of the Shinjo basin, Geochemical Journal, 2002, 36(1), 31-49.

U.S. Appl. No. 12/175,468, Ryder et al.
Partial International Search Report.

* cited by examiner

CARBOB Gasoline sourced from BP, Carson Refinery, CA

CARBOB Gasoline sourced from BP, Carson Refinery, CA

```
                          SEQUENCE LISTING

<160> NUMBER OF SEQ ID NOS: 12

<210> SEQ ID NO 1
<211> LENGTH: 4247
<212> TYPE: DNA
<213> ORGANISM: Artificial Sequence
<220> FEATURE:
<223> OTHER INFORMATION: MevT66 operon

<400> SEQUENCE: 1
gaattcaaag gaggaaaata aaatgaagaa ctgtgtgatt gtttctgcgg tccgcacggc      60
gatcggcagc tttaacggct ctttagcgag cacctctgca atcgatctgg gtgcgacggt     120
cattaaggcc gccattgaac gcgccaaaat cgacagccag cacgttgatg aggtgatcat     180
gggcaatgtg ttacaagccg gcctgggtca aaacccagcg cgtcaagcac tgttaaaatc     240
tggtctggcc gagaccgtgt gtggcttcac cgtcaataag gtttgcggct ctggcctgaa     300
gagcgtggcc ctggcagcac aagcgattca agccggtcag gcacaaagca tcgttgcggg     360
tggcatggag aacatgtctc tggcgccgta cttattagat gccaaagccc gcagcggtta     420
tcgcctgggc gatggtcagg tgtacgacgt catcttacgc gatggcttaa tgtgcgcgac     480
ccacggttac cacatgggta ttacggccga aaacgtggcg aaagaatacg gcattacgcg     540
cgagatgcag gatgaattag cactgcactc tcagcgcaaa gcagcagccg cgatcgagtc     600
tggtgcgttt acggcggaaa tcgtgccagt taacgtggtc acgcgcaaga agacgttcgt     660
tttcagccag gacgagttcc cgaaggcaaa cagcaccgcg gaggccttag gtgccttacg     720
cccagccttt gacaaagcgg gcacggtcac cgccggtaat gcgagcggca tcaatgatgg     780
tgcagcggca ctggtcatca tggaagagag cgccgcatta gcagcgggtc tgaccccatt     840
agcgcgcatt aaatcttatg ccagcggcgg cgtcccacca gccctgatgg gcatgggtcc     900
```

```
ggtcccagcc acgcaaaaag ccctgcaatt agcgggcctg caactggccg acattgatct   960
gatcgaggcg aacgaggcgt tgcagcgca gttcctggcg gtgggtaaga atctgggctt  1020
cgacagcgag aaagtcaatg tgaacggtgg cgcgattgcg ttaggccatc cgattggtgc  1080
aagcggcgca cgcatcttag tgacgttact gcacgccatg caggcacgcg acaagacctt  1140
aggcctggcg accttatgta ttggtggcgg tcaaggtatc gccatggtga tcgaacgcct  1200
gaactgaaga tctaggagga aagcaaaatg aaactgagca ccaagctgtg ctggtgtggc  1260
atcaagggtc gcctgcgccc acaaaagcag caacagctgc acaacacgaa cctgcaaatg  1320
accgagctga aaaagcagaa gacggccgag caaaagaccc gcccgcagaa cgttggcatc  1380
aagggcatcc agatttatat cccgacgcag tgtgtcaacc aatctgagct ggagaaattc  1440
gatggcgtca gccagggtaa gtacaccatc ggcctgggcc agaccaacat gagcttcgtg  1500
aacgaccgtg aggacatcta ttctatgagc ctgacggtgc tgtctaagct gatcaagagc  1560
tacaacatcg cacgaataa gatcggtcgt ctggaggtgg gtacgagac gctgattgac  1620
aagagcaaaa gcgtgaagtc tgtcttaatg cagctgttcg gcgagaacac ggatgtcgag  1680
ggtatcgaca ccctgaacgc gtgttacggc ggcaccaacg cactgttcaa tagcctgaac  1740
tggattgaga gcaacgcctg ggatggccgc gatgcgatcg tcgtgtgcgg cgatatcgcc  1800
atctatgaca agggtgcggc acgtccgacc ggcggtgcag gcaccgttgc gatgtggatt  1860
ggcccggacg caccaattgt cttcgattct gtccgcgcgt cttacatgga gcacgcctac  1920
gacttttaca gccggactt cacgagcgaa tacccgtacg tggacggcca cttctctctg  1980
acctgctatg tgaaggcgct ggaccaggtt tataagtctt atagcaaaaa ggcgatttct  2040
aagggcctgg tcagcgaccc ggcaggcagc gacgccctga acgtgctgaa gtatttcgac  2100
tacaacgtgt ccatgtccc gacctgcaaa ttagtgacca aatcttatgg ccgcctgtta  2160
tataatgatt tccgtgccaa cccgcagctg ttcccggagg ttgacgccga gctggcgacg  2220
cgtgattacg acgagagcct gaccgacaag aacatcgaga agaccttcgt caacgtcgcg  2280
aagccgttcc acaaagagcg tgtggcccaa agcctgatcg tcccgaccaa cacgggcaac  2340
atgtataccg cgtctgtcta cgcggcattc gcgagcctgc tgaattacgt cggttctgac  2400
gacctgcagg gcaagcgcgt tggcctgttc agctacggta gcggcttagc ggccagcctg  2460
tatagctgca aaattgtcgg cgacgtccag cacatcatca aggagctgga catcaccaac  2520
aagctggcga gcgcatcac cgagacgccg aaagattacg aggcagcgat cgagttacgc  2580
gagaatgcgc atctgaagaa gaacttcaag ccgcaaggta gcatcgagca cctgcagagc  2640
ggcgtctact acctgacgaa cattgacgac aagttccgcc gttcttatga cgtcaaaaag  2700
taactagtag gaggaaaaca tcatggtgct gacgaacaaa accgtcatta gcggcagcaa  2760
ggtgaagtct ctgagcagcg cccaaagctc tagcagcggc ccgtctagca gcagcgagga  2820
ggacgacagc cgtgacattg agtctctgga caagaagatc cgcccgctgg aggagttaga  2880
ggccctgctg agcagcggca acaccaagca gctgaagaac aaggaagttg cagcgctggt  2940
gatccacggt aagctgccac tgtatgcgct ggaaaagaaa ctgggcgata cgacgcgtgc  3000
ggtcgcggtg cgtcgcaaag ccttaagcat cttagcggag gccccggtgt agccagcga  3060
ccgcctgccg tacaagaact acgactacga ccgcgtgttt ggcgcgtgct gcgagaatgt  3120
cattggctac atgccgttac cggttggtgt gatcggcccg ctggtcattg atggcacgag  3180
ctatcacatt ccaatggcga ccacggaagg ttgcttagtc gccagcgcca tgcgtggctg  3240
taaggcgatt aacgccggcg gtggcgcgac gaccgtgtta accaaggatg gtatgacgcg  3300
```

```
cggtccggtc gtccgcttcc caacgctgaa gcgcagcggc gcgtgtaaga tttggctgga    3360
ttctgaggag ggccaaaacg cgatcaagaa agccttcaac tctacgagcc gtttcgcgcg    3420
tttacagcat atccgacct gcctggccgg cgacctgctg ttcatgcgct ccgcaccac      3480 cacgggcgat gcgatgggca tgaacatgat cagcaagggc gtcgaatata gcctgaaaca   3540
aatggtggaa gaatatggct gggaggacat ggaggttgtc tctgtgagcg gcaactattg   3600
caccgacaag aagccggcag ccattaactg gattgagggt cgcggcaaaa gcgtcgtggc   3660
agaagcgacc atcccaggcg acgtggtccg taaggttctg aagagcgacg tcagcgccct   3720
ggttgagtta aatatcgcga aaaacctggt cggcagcgcg atggcgggca gcgtgggtgg   3780
ctttaacgca catgcagcga atctggttac ggcggttttc ttagccttag gtcaggaccc   3840
agcccaaaat gtcgagagca gcaactgcat taccttaatg aaagaggttg acggtgacct   3900
gcgcatcagc gtttctatgc cgtctatcga ggtcggcacg atcggcggcg caccgttt      3960 agaaccgcaa ggtgcgatgc tggatctgct gggcgtgcgc ggcccacatg caacggcccc   4020
aggcaccaat gcccgccaac tggcccgtat cgtggcctgc gcggttctgg cgggtgagct   4080
gagcctgtgc gccgcattag ccgcgggcca tttagttcaa tctcacatga cccacaaccg   4140
caagccggca gaaccaacca agccaaataa cctggacgca accgacatta accgtctgaa   4200
ggatggcagc gtcacgtgca ttaaaagctg agcatgctac taagctt                 4247

<210> SEQ ID NO 2
<211> LENGTH: 49
<212> TYPE: DNA
<213> ORGANISM: Artificial Sequence
<220> FEATURE:
<223> OTHER INFORMATION: Primer 4-49 mvaA SpeI

<400> SEQUENCE: 2
gctactagta ggaggaaaac atcatgcaaa gtttagataa gaatttccg                49

<210> SEQ ID NO 3
<211> LENGTH: 39
<212> TYPE: DNA
<213> ORGANISM: Artificial Sequence
<220> FEATURE:
<223> OTHER INFORMATION: Primer 4-49 mvaAR XbaI

<400> SEQUENCE: 3
gcttctagac tattgttgtc taatttcttg taaaatgcg                           39

<210> SEQ ID NO 4
<211> LENGTH: 55
<212> TYPE: DNA
<213> ORGANISM: Artificial Sequence
<220> FEATURE:
<223> OTHER INFORMATION: Primer HMGS 5-prime Sa mvaS-S

<400> SEQUENCE: 4
gaactgaaga tctaggagga agcaaaatg acaataggta tcgacaaaat aaact          55

<210> SEQ ID NO 5
<211> LENGTH: 52
<212> TYPE: DNA
<213> ORGANISM: Artificial Sequence
<220> FEATURE:
<223> OTHER INFORMATION: Primer HMGS 3-prime Sa mvaS-AS

<400> SEQUENCE: 5
```

```
ttgcatgatg ttttcctcct actagttact ctggtctgtg atattcgcga ac         52
```

<210> SEQ ID NO 6
<211> LENGTH: 42
<212> TYPE: DNA
<213> ORGANISM: Artificial Sequence
<220> FEATURE:
<223> OTHER INFORMATION: Primer 19-25 atoB SfiI-S

<400> SEQUENCE: 6

```
gctaggccat cctggccatg aagaactgtg tgattgtttc tg                    42
```

<210> SEQ ID NO 7
<211> LENGTH: 33
<212> TYPE: DNA
<213> ORGANISM: Artificial Sequence
<220> FEATURE:
<223> OTHER INFORMATION: Primer 19-25 mvaA-AsiSI-AS

<400> SEQUENCE: 7

```
gcttgcgatc gccggcggat tgtcctact cag                               33
```

<210> SEQ ID NO 8
<211> LENGTH: 1117
<212> TYPE: DNA
<213> ORGANISM: Artificial Sequence
<220> FEATURE:
<223> OTHER INFORMATION: Codon-optimized Arabidopsis thaliana geranyl
      diphosphate synthase gene with flanking NotI and SacI restriction
      enzyme sites

<400> SEQUENCE: 8

```
gcggccgcgg aaaaggaggc cggccggcat gctgctgtct aataaactgc gtgaaatggt    60
tctggctgaa gtacctaaac tggcctccgc agcagaatat tcttcaagc gtggcgttca   120
gggcaaacag ttccgtagca ccatcctgct gctgatggct accgccctgg acgtgcgtgt   180
cccggaagcc ctgatcggcg aatccaccga catcgtgacc tctgaactgc gtgttcgtca   240
gcgtggtatc gcggaaatca ccgaaatgat ccacgttgcg tctctgctgc acgacgatgt   300
gctggacgat gcagacaccc gtcgtggtgt tggttccctg aacgtggtga tgggtaacaa   360
aatgagcgtg ctggcaggcg actttctgct gtctcgcgcc tgtggtgctc tggctgcgct   420
gaagaacacc gaggtagtgg cactgctggc gactgccgta gagcacctgg ttaccggcga   480
aacgatggaa attacttctt ccaccgaaca gcgttactcc atggactact acatgcagaa   540
gacttactat aaaaccgcgt ccctgattag caactcttgt aaagcagtag cagtactgac   600
tggccaaact gcagaagtag cggtgctggc tttcgagtac ggtcgtaacc tgggtctggc   660
tttccagctg atcgatgaca tcctggactt tactggtacc agcgcaagcc tgggtaaagg   720
ttccctgtct gacattcgtc acggcgttat caccgctccg attctgttcg cgatggaaga   780
attcccgcag ctgcgtgaag ttgttgacca ggttgaaaaa gacccgcgta acgtcgatat   840
cgcactggaa tacctgggca aatccaaagg tatccaacgc gcgcgtgaac tggctatgga   900
gcacgccaac ctggcagcag cagcaattgg ctctctgccg aaaccgacac gaagatgt    960
taaacgcagc cgtcgtgcac tgatcgacct gactcatcgt gtaatcaccc gcaacaaata  1020
agattgagtg atgttcctga gcatccacca gaacattccg cactttatct gtcgtattct  1080
gctggtgcaa ttcgtaagcc gctgataata ggagctc                          1117
```

<210> SEQ ID NO 9
<211> LENGTH: 1782

```
<212> TYPE: DNA
<213> ORGANISM: Artificial Sequence
<220> FEATURE:
<223> OTHER INFORMATION: Codon-optimized Pinus taeda alpha-pinene
      synthase gene with flanking XmaI and XbaI restriction enzyme sites

<400> SEQUENCE: 9
ggaattcccg ggcgagctct ttacactta tgcttccggc tcgtataatg tgtggaattg      60
tgagcggata acaattgaat tcaaaggagg aaaataaaat ggatgatgat tctattgcat    120
ctctgagcac gtcctatgaa gctcctagct accgcaagcg tgcggataaa ctgattggcg    180
aagtgaaaaa tatctttgat ctgatgtctg tggaggatgg tgttttcact agcccgctga    240
gcgacctgca ccatcgcctg tggatggttg actctgttga acgcctgggc atcgaccgtc    300
actttaagga cgagatcaac agcgctctgg atcatgtgta ctcttactgg accgaaaagg    360
gtatcggccg tggccgtgaa tctggtgtaa ccgatctgaa cagcaccgca ctgggcctgc    420
gtaccctgcg cctgcacggt tataccgtat ctagccatgt cctggatcac ttcaagaacg    480
aaaaaggtca gttcacttgt tccgcgatcc agaccgaagg cgaaattcgt gacgttctga    540
acctgttccg tgcgtccctg atcgcgtttc cgggtgaaaa gatcatggaa gcggccgaaa    600
tcttctccac catgtacctg aaagacgctc tgcagaaaat tccgccgtcc ggtctgagcc    660
aggaaattga atatctgctg gagttcggct ggcacaccaa cctgccgcgt atggaaaccc    720
gcatgtatat cgacgtcttt ggcgaagaca ccaccttcga aaccccgtac ctgatccgtg    780
aaaaactgct ggaactggcg aaactggaat ttaacatctt tcattccctg gtgaaacgtg    840
aactgcagtc cctgtcccgc tggtggaagg actacggttt ccctgaaatc accttctctc    900
gtcaccgtca cgtagaatac tacaccctgg ctgcctgtat cgctaatgac cgaaacacaa    960
gcgcttttcg tctgggcttc ggtaaaatct ctcacatgat taccatcctg gatgacattt   1020
atgacacctt cggcaccatg gaagagctga actgctgac cgcagctttc aaacgttggg   1080
acccgagctc cattgagtgt ctgccagact atatgaaggg tgtttatatg gcagtttacg   1140
ataacattaa cgagatggcg cgtgaagcgc agaagatcca gggttgggac acggtttcct   1200
atgcgcgcaa gtcttgggaa gctttatcg gcgcgtacat tcaggaggct aaatggattt   1260
cttccggcta cctgccgacc ttcgacgaat acctggagaa cggtaaagtc tccttcggct   1320
cccgtatcac taccctggaa ccgatgctga ctctgggttt tccgctgccg cctcgtattc   1380
tgcaggaaat cgacttcccg tctaaattca acgacctgat ctgtgcaatc ctgcgtctga   1440
aggcgatac tcagtgctat aaagcggacc gtgcacgcgg tgaagaagcc tctgcggttt   1500
cctgttatat gaaagaccat ccgggtatta ccgaagaaga tgcctaaac caggtgaacg   1560
cgatggtgga taatctgacc aaagaactga actgggaact gctgcgtccg gattccggcg   1620
tcccgatcag ctataaaaag gtggcgttcg atatttgccg cgttttccac tacggttaca   1680
aatatcgcga tggtttctcc gtggcatcta tcgaaatcaa aaacctggtg actcgtaccg   1740
tcgtggaaac ggtgccgctg tgatagtaat ctagaggaat tt                      1782
```

<210> SEQ ID NO 10
<211> LENGTH: 1725
<212> TYPE: DNA
<213> ORGANISM: Artificial Sequence
<220> FEATURE:
<223> OTHER INFORMATION: Codon-optimized nucleotide sequence of the
      Citrus limon gamma-terpinene synthase gene with flanking XmaI
      and XbaI restriction enzyme sites

<400> SEQUENCE: 10

```
ggaattcccg ggcgagctct ttacacttta tgcttccggc tcgtataatg tgtggaattg    60
tgagcggata acaattgaat tcaaaggagg aaaataaaat gagcttcgat tatattcaga   120
gcctggattc taagtacaag ggtgaatctt acgcccgtca gcttgagaaa ctgaaagaac   180
aagtgtccgc aatgctgcag caggacaaca aagtcgttga cctggaccca ctgcatcagc   240
tggaactgat cgataatctg caccgtctgg gcgtgagcta ccatttcgag gatgagatca   300
aacgtaccct ggatcgtatc cacaacaaaa acaccaacaa aagcttgtat gcgcgtgcgc   360
tgaaattccg catcctgcgt cagtacggct ataagacccc ggttaaggaa acgttctctc   420
gcttcatgga cgaaaaaggc agcttcaaac tgtcctctca ttctgatgaa tgcaaaggca   480
tgctggctct gtacgaagct gcatatctcc tggttgaaga agaatcttcc atcttccgtg   540
atgcgatccg ctttaccacg gcatacctga agaatgggt agcgaaacac gatattgata   600
aaaacgataa cgaatatctg tgcaccttgg tgaaacacgc actggaactg ccgctgcatt   660
ggcgcatgcg tcgtctggag gctcgctggt tcatcgacgt ctatgagtct ggcccggata   720
tgaacccgat cctgctggag ctggccaaag ttgactacaa catcgttcag gctgtgcacc   780
aggaggacct gaaatacgtt tcccgttggt ggaagaaaac tggtctgggc gaaaaactga   840
acttcgcacg tgatcgtgtt gtggaaaact cttctggac cgttggcgat atcttcgaac   900
cgcagttcgg ctactgccgc cgtatgtctg ctatggtaaa ctgtctgctg acctccattg   960
atgatgtata cgatgtttat ggtactctgg atgaacttga actgttcact gatgcggtag  1020
aacgctggga tgctaccact actgaacagt tgccttatta catgaagttg tgtttccacg  1080
cgctgtacaa ctccgtaaac gaatgggct tcatcgctct gcgtgatcag gaagtaggta  1140
tgattattcc atatctgaag aaagcatggg cggatcagtg taaatcctac ctggtggaag  1200
caaaatggta caactctggc tacattccta ctctgcagga gtacatggag aacgcgtgga  1260
tctccgttac cgcgcctgta atgctgttgc acgcgtacgc attcaccgct aacccaatca  1320
ccaaggaagc actggaattt ctgcaggact cgccggatat catccgtatc tcctccatga  1380
tcgtgcgtct ggaagacgat ctgggtacct ccagcgatga actgaaacgt ggtgacgtcc  1440
cgaaaagcat ccagtgttac atgcacgaaa ccggcgtttc tgaagacgag gctcgtgaac  1500
atattcgtga cctcattgca gaaacctgga tgaagatgaa ctctgcgcgt ttcggtaacc  1560
cgccgtacct gccggatgtt tttatcggta tcgcgatgaa cctggtgcgt atgtcccaat  1620
gtatgtattt gtacggcgat ggtcatggtg tacaggaaaa cactaaagac cgcgtcctgt  1680
ctctgttcat cgatccgatc ccgtgatagt aatctagagg aattt           1725
```

<210> SEQ ID NO 11
<211> LENGTH: 1737
<212> TYPE: DNA
<213> ORGANISM: Artificial Sequence
<220> FEATURE:
<223> OTHER INFORMATION: Codon-optimized nucleotide sequence of the
      Ocimum basilicum terpinolene synthase gene with flanking XmaI
      and XbaI restriction enzyme sites

<400> SEQUENCE: 11

```
ggaattcccg ggcgagctct ttacacttta tgcttccggc tcgtataatg tgtggaattg    60
tgagcggata acaattgaat tcaaaggagg aaaataaaat ggattttaac tatctgcagt   120
ctctgaataa ttaccaccac aaagaggaac gttacctgcg ccgccaggcc gatctgatcg   180
aaaaagtgaa aatgattctg aaagaggaga aatggaggc cctgcaacag ctggagctga   240
```

```
tcgacgacct gcgtaacctg ggcctgtctt actgctttga cgatcaaatt aaccatatcc    300
tgacgaccat ctataaccag cactcctgct tccactatca cgaagcggct acctctgagg    360
aagcgaacct gtacttcacc gccctgggtt tccgtctgct gcgcgaacac ggcttcaaag    420
tgagccagga agtgttcgat cgttttaaga acgaaaaagg caccgatttc cgtccggatc    480
tggttgatga tacccagggt ctgctgcaac tgtatgaagc aagctttctg ctgcgtgaag    540
gcgaggacac tctggaattc gcacgccaat tcgcaacgaa attcctgcaa aagaaagtcg    600
aagaaaagat gattgaagaa gaaaacctgc tgtcttggac cctgcacagc tggaactgc     660 cgctgcactg gcgtatccag cgtctggaag cgaaatggtt cctggatgcg tacgcttctc    720
gcccagacat gaacccgatt attttcgaac tggccaaact ggaatttaat atcgctcagg    780
cactgcagca ggaagaactg aaggacctga gccgttggtg aacgatact ggtatcgcgg     840 aaaaactgcc gttcgcgcgt gatcgtatcg tggaatccca ctactgggct atcggcaccc    900
tggagccgta ccagtaccgt taccagcgct ctctgatcgc gaaaatcatc gctctgacca    960
cggtggttga cgatgtgtac gacgtttacg gtactctgga cgaactgcag ctgttcaccg   1020
atgcaatccg tcgttgggat atcgaatcta tcaaccaact gccgtcttat atgcaactgt   1080
gttacctggc gatctataac tttgtgtctg aactggccta tgacatcttc cgcgacaaag   1140
gtttcaattc cctgccgtac ctgcacaaaa gctggctgga cctggtagaa gcgtatttcc   1200
aggaggcgaa gtggtatcac agcggctaca ccccgtccct ggaacagtac ctgaacattg   1260
cacagatcag cgtggcgtct ccggcgatcc tgtctcagat ctacttcacc atggcgggca   1320
gcattgacaa accggtgatt gaaagcatgt acaaatatcg tcatattctg aatctgtccg   1380
gcatcctgct gcgtctgcca gacgatctgg gcaccgcctc cgacgaactg gccgtggtg    1440 acctggcaaa agcgatgcag tgctacatga agagcgtaa cgttagcgaa gaagaagcgc    1500
gcgatcacgt tcgtttcctg aaccgtgaag tttccaaaca gatgaatccg gcacgtgctg   1560
ctgatgattg cccgttcact gacgattttg tggtcgcagc agccaacctg ggtcgcgtag   1620
ctgacttcat gtacgtggaa ggtgatggtc tgggcctgca ataccctgct atccaccagc   1680
acatggcgga actgctgttc catccgtatg cctaatgata gtaatctaga ggaattt     1737
```

<210> SEQ ID NO 12
<211> LENGTH: 1785
<212> TYPE: DNA
<213> ORGANISM: Artificial Sequence
<220> FEATURE:
<223> OTHER INFORMATION: Codon-optimized nucleotide sequence of the
      Pseudotsuga menziesii terpinolene synthase gene with flanking
      XmaI and XbaI restriction enzyme sites

<400> SEQUENCE: 12

```
ggaattcccg ggcgagctct ttacacttta tgcttccggc tcgtataatg tgtggaattg     60
tgagcggata acaattgaat tcaaaggagg aaaataaaat ggatgacaac tttattcagt    120
ctctgtccag cccgtatgaa gaatcttctt acggcgatcg tgccgaaact ctgatcggcg    180
aagtaaagga gatcttcaac agcctgtcta tgactggtgt agttagcccg ctgaacgacc    240
tgctgcagcg tctgctgatg gtggataacg ttgagcgtct gggtatcgaa cgccacttcc    300
agaacgaaat caagagcgcc ctgcagtatg tgtactctta ctggtctgag aatggtattg    360
gctgcggtaa agactccgtt agcaccgacc tgaacaccac tgcactgggc ttccgtatcc    420
tgcgcctgca tggttatacc gtgttctccg acgtactgga acagttcaaa gaccagaaag    480
gccagttcgc gagcgcttgg tccgcgaacc ataccgaacg ccaaatccgt tccgtcctga    540
```

-continued

```
acctgtttcg cgcttccctg atcgcgttcc caggtgaaaa agtgatggaa gaggcacaaa    600
tcttctccgc gacctatctg aaagaggcgc tgcagactat cccgctgtct ggcctgtctc    660
aggaaatcca gtacgcgctg gaataccgtt ggcattctaa cctgccgcgc ctggaagttc    720
gtagctatat tgatatcctg gcagaaaata ctattaacga aatgagctac ccgaaggttg    780
agaaactgct ggagctggcg aaactggaat tcaacatctt ccatagcctg cagcagaagg    840
agctgcagtg tatctggcgc tggtggaaag aatccggctc tccggagctg acgtttgtgc    900
gtcatcgtta tgtagagtac tacaccctgg tggctggcat cgatatggaa ccgcagcact    960
ctgccttccg catcgcgtac gtcaagatgt gccacctgat caccattctg gatgatatgt   1020
atgatacttt cggcaccatc gacgagctgc gtctgttcac tgctgccgta aaacgctggg   1080
accgtagccc gaccgagtgc ctgccgcagt acatgaaagg tgtctatatg gtgctgtacg   1140
acacggttaa tgaaatggcc tgtgaagctc tgaaaagcca gggctgggat acgctgaatt   1200
atgctcgcca ggctttcgaa gattacatcg attcttacct gaaggaggca gaatggatct   1260
ccactggtta cctgccgacc ttcgaagaat atctggaaaa cggtaaagtg tcctccgcgc   1320
accgtgttgc aaccctgcag ccgatcctga ccctggatat cccgtttcca ctgcacatca   1380
tccaggaaat cgacttcccg tccaaattta acgattccgc ttcctctatc ctgcgtctgc   1440
gtggcgatac ccgttgttat caagcggata tggcacgcgg tgaagaggca tcctctatct   1500
cctgctatat gcacgataat ccgggctcta ctgaagaaga tgcgctgaac cacattaacg   1560
gtatgatcga ggacattatc aaagaactga actgggaact gctgcgtaag gacatcaacg   1620
ttccgattag ctgcaaaaag catgcgttcg aaatttctcg tggcttccac cacttttaca   1680
aagatcgcga cggttacact gtctctaaca tcgaaccaa ggatctggta atgaaaactg   1740
tcctggaacc ggtgcctctg taatgatagt aatctagagg aattt            1785
```

FUEL COMPOSITIONS COMPRISING TETRAMETHYLCYCLOHEXANE

PRIOR RELATED APPLICATIONS

This application claims the benefit under 35 U.S.C. §119(e) of U.S. Provisional Patent Application No. 60/950,879, filed Jul. 20, 2007, which is incorporated herein by reference in its entirety.

FIELD OF THE INVENTION

This invention encompasses, among other things, fuel compositions comprising a tetramethylcyclohexane and methods of making and using the fuel compositions. In certain embodiments, the tetramethylcyclohexane is derived from a $C_{10}$ isoprenoid compound. In other embodiments, the tetramethylcyclohexane comprises a quaternary carbon. In further embodiments, the fuel compositions comprise a petroleum-based fuel component.

BACKGROUND OF THE INVENTION

Biofuel is generally a fuel derived from biomass, i.e., recently living organisms or their metabolic byproducts, such as manure from animals. Biofuel is desirable because it is a renewable energy source, unlike other natural resources such as petroleum, coal and nuclear fuels. Biofuel includes, inter alia, biologically produced alcohols, alkenes and derivatives thereof. Generally, such biologically produced biofuel can be formed by the action of microbes and enzymes through fermentation of biomass. For example, methanol can be produced from fermentation of wood or other organic materials or formed naturally in the anaerobic metabolism of many varieties of bacteria. Similarly, ethanol can be mass-produced by fermentation of starch or sugar which can be found in a wide variety of crops such as sugar cane, sugar beet and corn. Furthermore, various isoprenoid compounds can be prepared biologically from simple sugars using a host cell that has been modified to produce the desired isoprenoid compounds.

Recently, because of concerns over global warming, rising oil prices as well as decreasing oil reserves and increasing political instability in oil producing countries around the world, there are renewed interests from governments, industries and academics in biofuels, particularly biologically produced alcohols for automobiles. However, alcohols such as methanol, ethanol and propanol are volatile enough that they can cause engine vapor lock and evaporative emission problems. Furthermore, alcohols generally have a high affinity to water and therefore, they generally contain an undesirable amount of water that can cause corrosive problem to internal combustion engines that use them as fuels. As a result, there is a need for biofuels, such as non-alcoholic biofuels, that have a low affinity toward water. Further, there is also a need for biofuels that can be made reliably and reproducibly for use in internal combustion engines such as gasoline engines.

SUMMARY OF THE INVENTION

Provided herein are fuel components, fuel compositions and methods of making and using same. Embodiments of the fuel compositions disclosed herein are believed to satisfy the above-mentioned needs. In some embodiments, the fuel compositions comprise a tetramethylcyclohexane. In other embodiments, the tetramethylcyclohexane can be used as the fuel composition itself, a major component of the fuel composition or a minor component of the fuel composition. In still other embodiments, the tetramethylcyclohexane is an isoprenoid. In certain embodiments, the tetramethylcyclohexane is made by semi-chemical synthesis or a hybrid method and involves a $C_{10}$ isoprenoid that is made by a bioengineered microorganism. In some embodiments, the fuel compositions disclosed herein can be used as gasoline. In further embodiments, the fuel compositions disclosed herein can be used to power internal combustion engines such as gasoline engines.

In one aspect, provided herein are fuel compositions comprising a tetramethylcyclohexane in an amount of at least 5 wt. %, based on the total weight of the fuel composition, and a fuel component.

In certain embodiments, the fuel component is a petroleum-based fuel component. In other embodiments, the petroleum-based fuel component is gasoline, jet fuel or kerosene. In further embodiments, the fuel component is a coal-based fuel component.

In some embodiments, the fuel composition further comprises a fuel additive. In other embodiments, the fuel additive disclosed herein is selected from the group consisting of oxygenates, antioxidants, thermal stability improvers, cetane improvers, stabilizers, cold flow improvers, combustion improvers, anti-foams, anti-haze additives, corrosion inhibitors, lubricity improvers, icing inhibitors, injector cleanliness additives, smoke suppressants, drag reducing additives, metal deactivators, dispersants, detergents, demulsifiers, dyes, markers, static dissipaters, biocides and combinations thereof.

In certain embodiments, the amount of the tetramethylcyclohexane is at most about 30 wt. %, based on the total weight of the fuel composition. In other embodiments, the amount of the tetramethylcyclohexane is at most about 20 wt. %, based on the total weight of the fuel composition. In further embodiments, the amount of the tetramethylcyclohexane is at most about 10 wt. %, based on the total weight of the fuel composition.

In some embodiments, the fuel composition disclosed herein comprises (a)

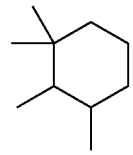

(1)

or at least one stereoisomer thereof;

(b)

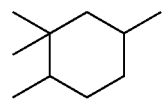

(2)

or at least one stereoisomer thereof;

(c)

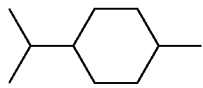
(14)

or at least one stereoisomer thereof;

(d)

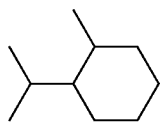
(17)

or at least one stereoisomer thereof; wherein the total amount of (a) and (b) is from about 1 wt. % to about 99 wt. %, and the total amount of (c) and (d) is from 0.5 wt. % to about 50 wt. %, based on the total weight of (a)-(d).

In certain embodiments, the fuel composition further comprises the following compounds:

(e)

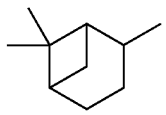
(24)

or at least one stereoisomer thereof;

(f)

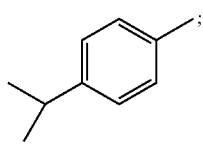
(11)

and (g)

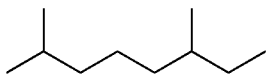
(27)

or at least one stereoisomer thereof; wherein the amount of (e) is from 0 wt. % to about 50 wt. %, the amount of (f) is from about 0.1 wt. % to about 20 wt. %, and the amount of (g) is from about 0.1 wt. % to about 30 wt. %, based on the total weight of (a)-(g).

In some embodiments, the total amount of (a) and (b) in the fuel composition is from about 50 wt. % to about 99 wt. %, based on the total weight of (a)-(g). In other embodiments, the total amount of (a) and (b) in the fuel composition is from about 80 wt. % to about 99 wt. %, based on the total weight of (a)-(g).

In some embodiments, the total amount of (c) and (d) in the fuel composition is less than about 10 wt. %, based on the total weight of (a)-(g).

In another aspect, provided herein are methods of making a fuel composition comprising contacting pinene with hydrogen in the presence of a hydrogenation catalyst to form at least a tetramethylcyclohexane.

In certain embodiments, the pinene is α-pinene, β-pinene or a combination thereof. In other embodiments, the hydrogenation catalyst comprises a ruthenium catalyst. In further embodiments, the ruthenium catalyst is ruthenium on a support material. In still further embodiments, the support material is carbon.

In some embodiments, the method further comprises the step of mixing the tetramethylcyclohexane with a fuel component to make the fuel composition. In further embodiments, the fuel component is a petroleum-based fuel component. In still further embodiments, the petroleum-based fuel component is gasoline, jet fuel or kerosene.

In another aspect, provided herein are vehicles comprising an internal combustion engine; a fuel tank connected to the internal combustion engine; and a fuel composition in the fuel tank, wherein the fuel composition comprises at least 5 wt. % of a tetramethylcyclohexane, based on the total weight of the fuel composition, and a fuel component, and wherein the fuel composition is used to power the internal combustion engine.

In certain embodiments, the internal combustion engine is a gasoline engine.

In another aspect, provided herein are vehicles comprising an internal combustion engine; a fuel tank connected to the internal combustion engine; and a fuel composition in the fuel tank, wherein the fuel composition is prepared by contacting pinene with hydrogen in the presence of a hydrogenation catalyst, and wherein the fuel composition is used to power the internal combustion engine.

In certain embodiments, the pinene is α-pinene, β-pinene or a combination thereof.

In some embodiments, the internal combustion engine is a gasoline engine.

In another aspect, provided herein are methods of making a fuel composition comprising
  (a) contacting a cell capable of making pinene with a sugar under conditions suitable for making pinene;
  (b) converting the pinene to pinane;
  (c) converting the pinane to at least a tetramethylcyclohexane; and
  (d) mixing the tetramethylcyclohexane with a fuel component to make the fuel composition.

In certain embodiments, the pinene is converted to pinane by hydrogen in the presence of a first hydrogenation catalyst. In other embodiments, the pinane is converted to tetramethylcyclohexane by hydrogen in the presence of a second hydrogenation catalyst. In further embodiments, the first hydrogenation catalyst and the second hydrogenation catalyst are the same. In still further embodiments, the first hydrogenation catalyst and the second hydrogenation catalyst are different.

In another aspect, provided herein are methods of making an RBOB comprising mixing a gasoline with a fuel composition comprising a tetramethylcyclohexane having a quaternary carbon atom in the cyclohexane ring, wherein the RBOB has a Reid vapor pressure from about 7.0 psi to about 15.0 psi, and wherein the amount of the amount of the tetramethylcyclohexane is from about 1 wt. % to about 50 wt. %, based on the total weight of the fuel composition.

In some embodiments, the tetramethylcyclohexane is

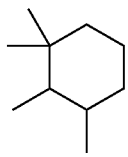
(1)

or at least one stereoisomer thereof.

In other embodiments, the tetramethylcyclohexane is

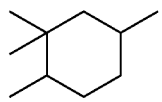
(2)

or at least one stereoisomer thereof.

In another aspect, provided herein are fuel tanks containing a fuel composition, wherein the fuel composition comprises at least 5 wt. % of a tetramethylcyclohexane, based on the total weight of the fuel composition, and a fuel component.

In further embodiments, the fuel tank is a vehicle fuel tank.

In another aspect, provided herein are fuel compositions comprising a gasoline and at least one tetramethylcyclohexane having a quaternary carbon atom in the cyclohexane ring, wherein the amount of the tetramethylcyclohexane is from about 1 wt. % to about 50 wt. %, based on the total weight of the fuel composition.

In some embodiments, the fuel composition disclosed herein further comprises a fuel additive. In further embodiments, the fuel additive is selected from the group consisting of oxygenates, antioxidants, thermal stability improvers, cetane improvers, stabilizers, cold flow improvers, combustion improvers, anti-foams, anti-haze additives, corrosion inhibitors, lubricity improvers, icing inhibitors, injector cleanliness additives, smoke suppressants, drag reducing additives, metal deactivators, dispersants, detergents, demulsifiers, dyes, markers, static dissipaters, biocides and combinations thereof.

In some embodiments, the tetramethylcyclohexane disclosed herein is

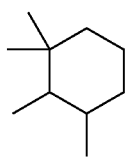
(1)

or at least one stereoisomer thereof.

In other embodiments, the tetramethylcyclohexane disclosed herein is

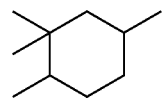
(2)

or at least one stereoisomer thereof.

In one aspect, provided herein are fuel compositions comprising a petroleum-based fuel component and at least one tetramethylcyclohexane having a quaternary carbon atom in the cyclohexane ring. In some embodiments, the amount of the tetramethylcyclohexane is at least about 1 wt. %, based on the total weight of the fuel composition. In other embodiments, the amount of the tetramethylcyclohexane is at least about 5 wt. %, based on the total weight of the fuel composition.

In some embodiments, the tetramethylcyclohexane is

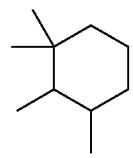
(1)

or at least one stereoisomer thereof.

In other embodiments, the tetramethylcyclohexane is

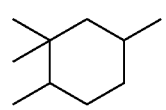
(2)

or at least one stereoisomer thereof.

In certain embodiments, the petroleum-based fuel component is gasoline, jet fuel, kerosene or a combination thereof. In other embodiments, the amount of the petroleum-based fuel component is at least about 40 wt. % and the amount of the tetramethylcyclohexane is from about 5 wt. % to about 50 wt. %, based on the total weight of the fuel composition.

In some embodiments, the fuel composition disclosed herein comprises (a)

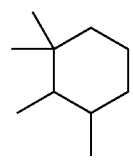
(1)

or at least one stereoisomer thereof;

(b)

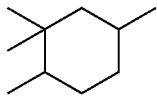 (2)

or at least one stereoisomer thereof;

(c)

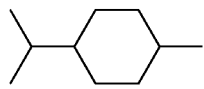 (14)

or at least one stereoisomer thereof;

(d)

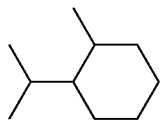 (17)

or at least one stereoisomer thereof; wherein the total amount of (a) and (b) is from about 1 wt. % to about 99 wt. %, and the total amount of (c) and (d) is from about 0.5 wt. % to about 50 wt. %, based on the total weight of (a)-(d).

In certain embodiments, the fuel composition further comprises the following compounds:

(e)

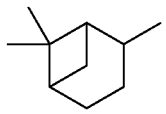 (24)

or at least one stereoisomer thereof;

(f)

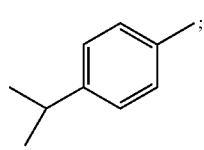 (11)

and (g)

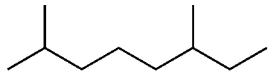 (27)

or at least one stereoisomer thereof; wherein the amount of (e) is from 0 wt. % to about 50 wt. %, the amount of (f) is from about 0.1 wt. % to about 20 wt. %, and the amount of (g) is from about 0.1 wt. % to about 30 wt. %, based on the total weight of (a)-(g).

In some embodiments, the total amount of (a) and (b) in the fuel composition is from about 50 wt. % to about 99 wt. %, based on the total weight of (a)-(g).

In another aspect, provided herein are methods of making a fuel composition comprising the steps of (a) contacting pinene with hydrogen in the presence of a hydrogenation catalyst to form at least one tetramethylcyclohexane having a quaternary carbon atom in the cyclohexane ring; and (b) mixing the tetramethylcyclohexane with a fuel component to make the fuel composition. In some embodiments, the fuel component is a petroleum-based fuel component.

In certain embodiments, the pinene is α-pinene, β-pinene or a combination thereof. In other embodiments, the hydrogenation catalyst comprises a ruthenium catalyst.

In another aspect, provided herein are vehicles comprising an internal combustion engine; a fuel tank connected to the internal combustion engine; and a fuel composition in the fuel tank, wherein the fuel composition comprises at least one tetramethylcyclohexane having a quaternary carbon atom in the cyclohexane ring, and wherein the fuel composition is used to power the internal combustion engine. In certain embodiments, the internal combustion engine is a gasoline engine.

In certain embodiments, the fuel composition disclosed herein has a Reid vapor pressure from about 7.0 psi to about 15.0 psi. In other embodiments, the fuel composition disclosed herein is an RBOB or a CARBOB. In further embodiments, the fuel composition disclosed herein meets the specifications of an RBOB or a CARBOB.

DEFINITIONS

Figure 1:
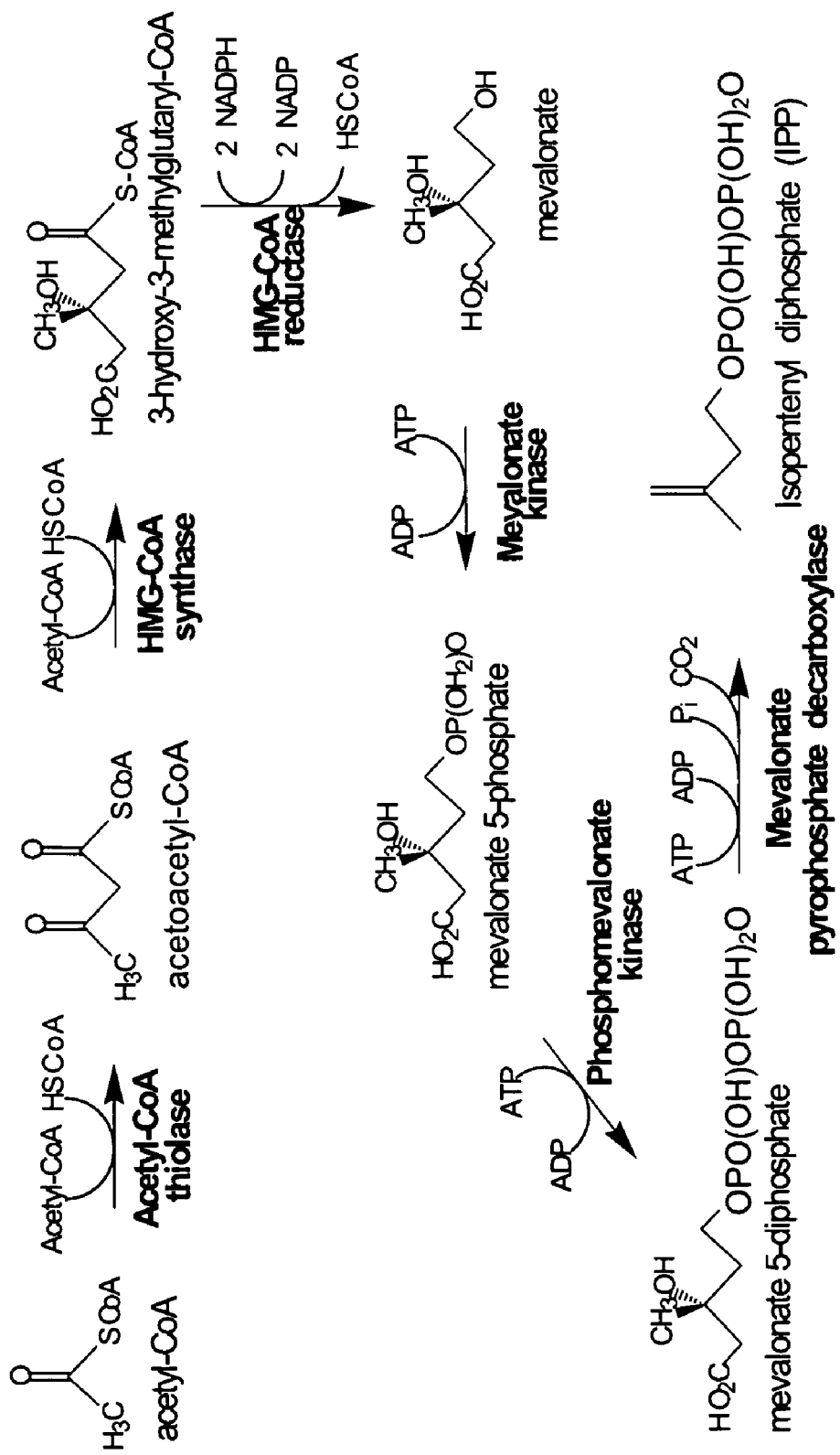
FIG. 1 is a schematic representation of the mevalonate ("MEV") pathway for the production of isopentenyl diphosphate ("IPP").

"Bioengineered compound" refers to a compound made by a host cell, including any archae, bacterial, or eukaryotic cells or microorganism.

"Biofuel" refers to any fuel that is derived from a biomass, i.e., recently living organisms or their metabolic byproducts, such as manure from cows. It is a renewable energy source, unlike other natural resources such as petroleum, coal and nuclear fuels.

"Bioengineered fuel" refers to a fuel made at least in part by a host cell, including any archae, bacterial, or eukaryotic cells or microorganism.

"Fuel" refers to one or more hydrocarbons, one or more alcohols, one or more fatty esters or a mixture thereof. Preferably, liquid hydrocarbons are used. Fuel can be used to power internal combustion engines such as reciprocating engines (e.g., gasoline engines and diesel engines), Wankel engines, jet engines, some rocket engines, missile engines and gas turbine engines. In some embodiments, fuel typically comprises a mixture of hydrocarbons such as alkanes, cycloalkanes and aromatic hydrocarbons. In other embodiments, fuel comprises one or more of the substituted cycloalkanes disclosed herein.

"Fuel additive" refers to chemical components added to fuels to alter the properties of the fuel, e.g., to improve engine performance, fuel handling, fuel stability, or for contaminant control. Types of additives include, but are not limited to, antioxidants, thermal stability improvers, cetane improvers, stabilizers, cold flow improvers, combustion improvers, antifoams, anti-haze additives, corrosion inhibitors, lubricity improvers, icing inhibitors, injector cleanliness additives, smoke suppressants, drag reducing additives, metal deactivators, dispersants, detergents, demulsifiers, dyes, markers, static dissipaters, biocides and combinations thereof. The term "conventional additives" refers to fuel additives known to the skilled artisan, such as those described above, that are not the substituted cycloalkanes disclosed herein.

"Fuel composition" refers to a fuel that comprises at least two fuel components.

"Fuel component" refers to any compound or a mixture of compounds that are used to formulate a fuel composition. There can be "major fuel components" and "minor fuel components." A major fuel component is present in a fuel composition by at least 50% by volume; and a minor fuel component is present in a fuel composition by less than 50%. Fuel additives are minor fuel components. The tetramethylcyclohexanes disclosed herein can be major fuel components or minor fuel components, by themselves or in a mixture with other fuel components.

"Isoprenoid" and "isoprenoid compound" are used interchangeably herein and refer to a compound capable of being derived from IPP.

"Isoprenoid starting material" refers to an isoprenoid compound that is capable of being made by a host cell.

"$C_{10}$ isoprenoid" or "$C_{10}$ isoprenoid compound" refers to an isoprenoid consisting of 10 carbon atoms. In certain embodiments, the $C_{10}$ isoprenoid is a tetramethylcyclohexane disclosed herein such as tetramethylcyclohexanes having a quaternary carbon, e.g., 1,1,2,3-tetramethylcyclohexane and 1,1,2,5-tetramethylcyclohexane.

"Jet fuel" refers to a fuel suitable for use in a jet engine.

"Petroleum-based fuel" refers to a fuel that includes a fractional distillate of petroleum.

"RBOB," or Reformulated Blendstock for Oxygenate Blending refers to a non-oxygenated gasoline suitable for blending with an oxygenate, e.g., ethanol. In certain embodiments, an RBOB meets the requirements of the U.S. Environmental Protection Agency under Section 211(k) of the Clean Air Act. "CARBOB" refers to an RBOB suitable for use in California as regulated by the California Air Resources Board. "AZRBOB" or Arizona Blendstock for Oxygenate Blending refers to a non-oxygenated gasoline suitable for blending with an oxygenate for use in Arizona. "LVRBOB" or Las Vegas Blendstock for Oxygenate Blending refers to a non-oxygenated gasoline suitable for blending with an oxygenate for use in Las Vegas.

"Reid Vapor Pressure," or "RVP" of a fuel composition refers to the absolute vapour pressure exerted by the fuel composition at 100° F. In general, the higher the RVP value, the more readily the fuel composition will evaporate. The vapor pressure of a fuel composition may be measured according to any standard method acceptable by those of skill in the art. In certain embodiments, the Reid vapor pressure is measured according to ASTM D323-06.

As used herein, a composition that is a "substantially pure" compound is substantially free of one or more other compounds, i.e., the composition contains greater than 80 vol. %, greater than 90 vol. %, greater than 95 vol. %, greater than 96 vol. %, greater than 97 vol. %, greater than 98 vol. %, greater than 99 vol. %, greater than 99.5 vol. %, greater than 99.6 vol. %, greater than 99.7 vol. %, greater than 99.8 vol. %, or greater than 99.9 vol. % of the compound; or less than 20 vol. %, less than 10 vol. %, less than 5 vol. %, less than 3 vol. %, less than 1 vol. %, less than 0.5 vol. %, less than 0.1 vol. %, or less than 0.01 vol. % of the one or more other compounds, based on the total volume of the composition.

As used herein, a composition that is "substantially free" of a compound means that the composition contains less than 20 vol. %, less than 10 vol. %, less than 5 vol. %, less than 4 vol. %, less than 3 vol. %, less than 2 vol. %, less than 1 vol. %, less than 0.5 vol. %, less than 0.1 vol. %, or less than 0.01 vol. % of the compound, based on the total volume of the composition.

"Tetramethylcyclohexane" refers to a cyclohexane substituted with four methyl groups. The term also includes compounds wherein the tetramethylcyclohexane is further substituted with one or more additional substituents. In certain embodiments, the tetramethylcyclohexane comprises a quaternary carbon. In some embodiments, the tetramethylcyclohexane having a quaternary carbon includes 1,1,2,3-tetramethylcyclohexane and 1,1,2,5-tetramethylcyclohexane.

"Quaternary carbon" refers to a carbon atom bonded to four other carbon atoms with single bonds.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

In addition, certain compounds, as described herein may have one or more double bonds that can exist as either the Z or E isomer, unless otherwise indicated. The invention additionally encompasses the compounds as individual isomers substantially free of other isomers and alternatively, as mixtures of various isomers, e.g., racemic mixtures of stereoisomers.

DESCRIPTION OF EMBODIMENTS OF THE INVENTION

Provided herein are fuel components, fuel compositions and methods of making and using same.

Fuel Compositions

In one aspect, provided herein are fuel compositions comprising:
  (a) a tetramethylcyclohexane in an amount of at least 0.5%, based on the total amount of the fuel composition; and
  (b) a fuel component.

The amount of the tetramethylcyclohexane in the fuel composition can be from 0.5% to about 99%, from 0.5% to about 98%, from about 1% to about 90%, from about 1% to about 75%, from about 1% to about 50%, from about 1% to about 40%, from about 1% to about 30%, from about 5% to about 75%, from about 5% to about 60%, from about 5% to about 50%, from about 5% to about 40%, or from about 5% to about 30%, based on the total amount of the fuel composition. In certain embodiments, the amount of the tetramethylcyclohexane is at least about 1%, at least about 2%, at least about 3%, at least about 4%, at least about 5%, at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90% or at least about 95%, based on the total amount of the fuel composition. In other embodiments, the amount of the tetramethylcyclohexane is at most about 1%, at most about 2%, at most about 3%, at most about 4%, at most about 5%, at most about 10%, at most about 15%, at most about 20%, at most about 25%, at most about 30%, at most about 35%, at most about 40%, at most about 45%, at most about 50%, at most about 55%, at most about 60%, at most about 65%, at most about 70%, at most about 75%, at most about 80%, at most about 85%, at most about 90% or at most about 95%, based on the total amount of the fuel composition. In some embodiments, the amount is in wt. % based on the total weight of the fuel composition. In other embodiments, the amount is in vol. % based on the total volume of the fuel composition.

In some embodiments, the total amount of the tetramethylcyclohexane in the fuel compositions is from about 1% to about 99% by weight or volume, based on the total weight or volume of the fuel composition. In further embodiments, the total amount of the tetramethylcyclohexane is from about 25% to about 98% by weight or volume, based on the total weight or volume of the fuel composition. In further embodiments, the total amount of the tetramethylcyclohexane is from about 50% to about 95% by weight or volume, based on the total weight or volume of the fuel composition.

In some embodiments, the tetramethylcyclohexane is or comprises a tetramethylcyclohexane having at least one quaternary carbon atom in the cyclohexane ring. Some non-limiting examples of suitable tetramethylcyclohexanes having at least one quaternary carbon atom include Compounds (1)-(9) as shown below and their stereoisomers:

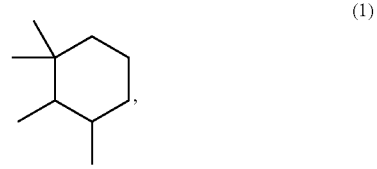

(1)

(2)

(3)

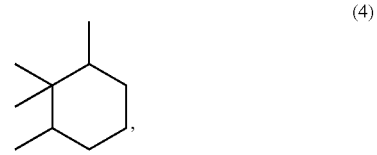

(4)

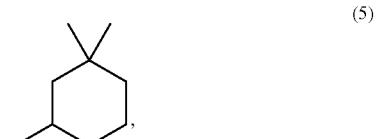

(5)

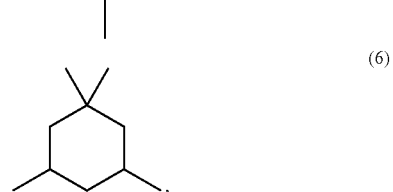

(6)

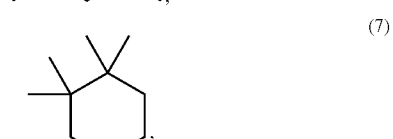

(7)

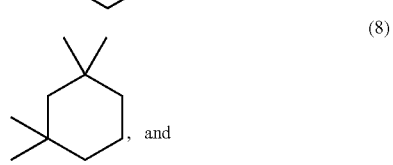

, and (8)

.

(9)

In some embodiments, the tetramethylcyclohexane is or comprises 1,1,2,3-tetramethylcyclohexane having formula (1):

(1)

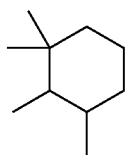

or one or more stereoisomers thereof.

In other embodiments, the 1,1,2,3-tetramethylcyclohexane is or comprises one or more of the following compounds:

(1a)

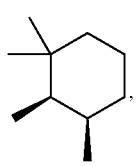

(1b)

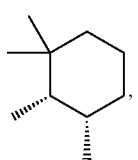

(1c)

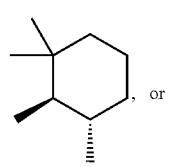

(1d)

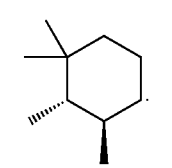

In some embodiments, the tetramethylcyclohexane is or comprises 1,1,2,5-tetramethylcyclohexane having formula (2)

(2)

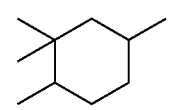

or one or more stereoisomers thereof.

In other embodiments, the 1,1,2,5-tetramethylcyclohexane is or comprises one or more of the following compounds:

(2a)

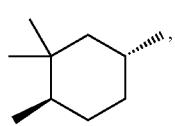

(2b)

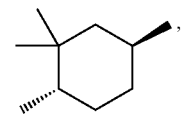

(2c)

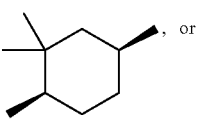

(2d)

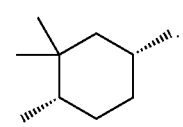

In some embodiments, the tetramethylcyclohexane is or comprises both (1)

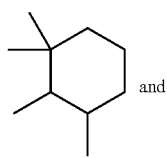

and (2)

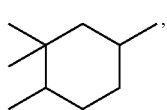

or stereoisomers thereof.

In other embodiments, the tetramethylcyclohexane is or comprises one or more of the following compounds:

(1a)

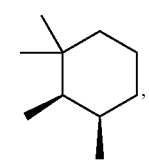

(1b)

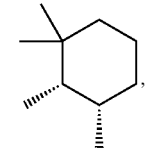

(1c)

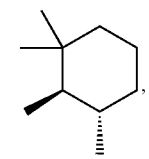

(1d)

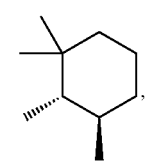

-continued

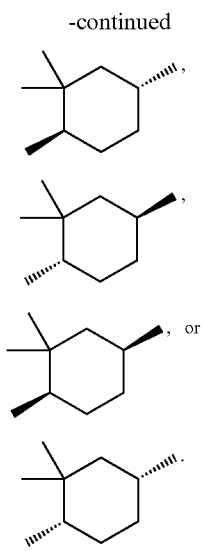

In some embodiments, a fuel component is a petroleum-based fuel component. The amount of the petroleum-based fuel component in the fuel composition disclosed herein may be from 0.1% to 99%, from 1% to 95%, from 2% to 90%, from 3% to 85%, from 5% to 80%, from 5% to 70%, from 5% to 60%, or from 5% to 50%, based on the total amount of the fuel composition. In certain embodiments, the amount of the petroleum-based fuel component is less than 95%, less than 90%, less than 85%, less than 75%, less than 70%, less than 65%, less than 60%, less than 55%, less than 50%, less than 45%, less than 40%, less than 35%, less than 30%, less than 25%, less than 20%, less than 15%, less than 10%, less than 5%, less than 4%, less than 3%, less than 2%, less than 1% or less than 0.5%, based on the total amount of the fuel composition. In other embodiments, the amount of the petroleum-based fuel component is at least 95%, at least 90%, at least 85%, at least 75%, at least 70%, at least 65%, at least 60%, at least 55%, at least 50%, at least 45%, at least 40%, at least 35%, at least 30%, at least 25%, at least 20%, at least 15%, at least 10%, at least 5%, at least 4%, at least 3%, at least 2%, at least 1% or at least 0.5%, based on the total amount of the fuel composition. In some embodiments, the amount is in wt. % based on the total weight of the fuel composition. In other embodiments, the amount is in vol. % based on the total volume of the fuel composition.

In some embodiments, the petroleum-based fuel component is gasoline. In certain embodiments, the gasoline meets one or more of the nine gasoline properties as specified in ASTM D 4814 for gasoline, which is incorporated herein by reference. In general, conventional gasoline is a mixture of hydrocarbons whose boiling point is below about 200° C., obtained in the fractional distillation of petroleum. The hydrocarbon constituents in the boiling range of gasoline are generally those hydrocarbons having 4 to 12 carbon atoms. In general, gasoline can vary widely in composition; even gasolines with the same octane number may be quite different in composition.

In some embodiments, the fuel composition is an RBOB or meets the specifications of an RBOB. In other embodiments, the fuel composition is a CARBOB or meets the specifications of a CARBOB. In further embodiments, the fuel composition is an AZRBOB or meets the specifications of AZRBOB. In further embodiments, the fuel composition is an LVRBOB or meets the specifications of LVRBOB. In certain embodiments, provided herein are fuel compositions comprising an RBOB fuel composition, as described herein, and an oxygenate. In certain embodiments, provided herein are fuel compositions comprising an RBOB fuel composition, as described herein, and ethanol. In certain embodiments, provided herein are fuel compositions comprising a CARBOB fuel composition, as described herein, and an oxygenate. In certain embodiments, provided herein are fuel compositions comprising a CARBOB fuel composition, as described herein, and ethanol. In certain embodiments, provided herein are fuel compositions comprising an AZRBOB fuel composition, as described herein, and an oxygenate. In certain embodiments, provided herein are fuel compositions comprising an AZRBOB fuel composition, as described herein, and ethanol. In certain embodiments, provided herein are fuel compositions comprising an LVRBOB fuel composition, as described herein, and an oxygenate. In certain embodiments, provided herein are fuel compositions comprising an LVRBOB fuel composition, as described herein, and ethanol.

In certain embodiments, provided herein are fuel compositions that meet federal or regional seasonal requirements or specifications for Reid vapor pressure (RVP). Certain fuel compositions or components disclosed herein can have a low RVP. As such, they can be blended with other fuel components, e.g., gasoline fuel components, with a higher RVP to adjust or lower the RVP of the resulting fuel composition. Accordingly, provided herein are methods of adjusting the RVP of a fuel component comprising the step of adding to the fuel component a fuel composition disclosed herein, for example, a fuel composition comprising a tetramethylcyclohexane as disclosed herein.

In certain embodiments, provided herein are fuel compositions having an RVP from about 7.0 pounds per square inch (psi) to about 15.0 psi. In some embodiments, provided herein are fuel compositions having an RVP from about 8.0 to about 10.0 psi. In certain embodiments, provided herein are fuel compositions having an RVP of about 5.78 psi. In some embodiments, provided herein are fuel compositions having an RVP of about 6.8 psi. In certain embodiments, provided herein are fuel compositions having an RVP of about 7.0 psi. In some embodiments, provided herein are fuel compositions having an RVP of about 7.1 psi. In certain embodiments, provided herein are fuel compositions having an RVP of about 7.8 psi. In some embodiments, provided herein are fuel compositions having an RVP of about 8.0 psi. In certain embodiments, provided herein are fuel compositions having an RVP of about 8.5 psi. In some embodiments, provided herein are fuel compositions having an RVP of about 9.0 psi. In certain embodiments, provided herein are fuel compositions having an RVP of about 10.0 psi. In some embodiments, provided herein are fuel compositions having an RVP of about 11.0 psi. In certain embodiments, provided herein are fuel compositions having an RVP of about 11.5 psi. In some embodiments, provided herein are fuel compositions having an RVP of about 12.5 psi. In certain embodiments, provided herein are fuel compositions having an RVP of about 13.5 psi. In some embodiments, provided herein are fuel compositions having an RVP of about 14.0 psi. In certain embodiments, provided herein are fuel compositions having an RVP of about 15.0 psi.

In other embodiments, the petroleum-based fuel component is kerosene. Conventional kerosene in general is a mixture of hydrocarbons, having a boiling point from 285° F. to 610° F. (from 140° C. to 320° C.).

In still other embodiments, the petroleum-based fuel component is jet fuel. Any jet fuel known to skilled artisans can be used herein. The American Society for Testing and Materials ("ASTM") and the United Kingdom Ministry of Defense ("MOD") have taken the lead roles in setting and maintaining specification for civilian aviation turbine fuel or jet fuel. The respective specifications issued by these two organizations are very similar but not identical. Many other countries issue their own national specifications for jet fuel, but they can be very nearly or completely identical to either the ASTM or MOD specification. ASTM D 1655 is the Standard Specification for Aviation Turbine Fuels and includes specifications for Jet A, Jet A-1 and Jet B fuels. Defence Standard 91-91 is the MOD specification for Jet A-1.

The most common jet fuel is a kerosene/paraffin oil-based fuel classified as Jet A-1, which is produced to an internationally standardized set of specifications. In the United States only, a version of Jet A-1 known as Jet A is also used. Another jet fuel that is commonly used in civilian aviation is called Jet B. Jet B is a lighter fuel in the naptha-kerosene region that is used for its enhanced cold-weather performance. Jet A, Jet A-1 and Jet B are specified in ASTM Specification D. 1655-68. Alternatively, jet fuels are classified by militaries around the world with a different system of JP numbers. Some are almost identical to their civilian counterparts and differ only by the amounts of a few additives. For example, Jet A-1 is similar to JP-8 and Jet B is similar to JP-4. Alternatively, jet fuels can also be classified as kerosene or naphtha-type. Some non-limiting examples of kerosene-type jet fuels include Jet A, Jet A1, JP-5 and JP-8. Some non-limiting examples of naphtha-type jets fuels include Jet B and JP-4.

Jet A is used in the United States while most of the rest of the world uses Jet A-1. Jet A is similar to Jet-A1, except for its higher freezing point of −40° C. An important difference between Jet A and Jet A-1 is the maximum freezing point. Jet A-1 has a lower maximum freezing temperature of −47° C. while Jet A has a maximum freezing temperature of −40° C. Like Jet A-1, Jet A has a fairly high flash point of minimum 38° C., with an autoignition temperature of 210° C.

In certain embodiments, a fuel component is a fuel additive. In some embodiments, the fuel additive is from about 0.1% to less than 50% by weight or volume, based on the total weight or volume of the fuel composition. In further embodiments, the fuel additive is selected from the group consisting of oxygenates, antioxidants, thermal stability improvers, cetane improvers, stabilizers, cold flow improvers, combustion improvers, anti-foams, anti-haze additives, corrosion inhibitors, lubricity improvers, icing inhibitors, injector cleanliness additives, smoke suppressants, drag reducing additives, metal deactivators, dispersants, detergents, demulsifiers, dyes, markers, static dissipaters, biocides and combinations thereof.

The amount of a fuel additive in the fuel composition disclosed herein may be from about 0.1% to less than about 45%, from about 0.2% to about 40%, from about 0.3% to about 30%, from about 0.4% to about 20%, from about 0.5% to about 15% or from about 0.5% to about 10%, based on the total amount of the fuel composition. In certain embodiments, the amount of a fuel additive is less than about 50%, less than about 45%, less than about 40%, less than about 35%, less than about 30%, less than about 25%, less than about 20%, less than about 15%, less than about 10%, less than about 5%, less than about 4%, less than about 3%, less than about 2%, less than about 1% or less than about 0.5%, based on the total amount of the fuel composition. In some embodiments, the amount is in wt. % based on the total weight of the fuel composition. In other embodiments, the amount is in vol. % based on the total volume of the fuel composition.

Some conventional fuel additives have been described in "Gasoline: Additives, Emissions, and Performance" by Society of Automotive Engineers, SAE International, 1995 (ISBN: 1560916451), which is incorporated herein by reference. Further, the following U.S. patents disclose various fuel additives that can be employed in embodiments of the invention as additives: U.S. Pat. Nos. 6,054,420; 6,051,039; 5,997,593; 5,997,592; 5,993,498; 5,968,211; 5,958,089; 5,931,977; 5,891,203; 5,882,364; 5,880,075; 5,880,072; 5,855,629; 5,853,436; 5,743,922; 5,630,852; 5,529,706; 5,505,867; 5,492,544; 5,490,864; 5,484,462; 5,321,172; and 5,284,492. The disclosures of all of the preceding U.S. patents are incorporated by reference herein in their entirety.

Illustrative examples of fuel additives are described in greater detail below. Oxygenates, which increase the weight % of oxygen in the fuel composition, are one example. Generally, oxygenates are combustible liquids comprising carbon, hydrogen and oxygen that can be categorized into two classes of organic compounds, i.e., alcohols and ethers. Some non-limiting examples of suitable oxygenates include ethanol, methyl tertiary-butyl ether (MTBE), tertiary-amyl methyl ether (TAME), and ethyl tertiary-butyl ether (ETBE).

Lubricity improvers are another example. Typically, the concentration of the lubricity improver in the fuel falls in the range of from 1 to 50,000 ppm, preferably about 10 to 20,000 ppm, and more preferably from 25 to 10,000 ppm. Some non-limiting examples of lubricity improver include esters of fatty acids.

Stabilizers improve the storage stability of the fuel composition. Some non-limiting examples of stabilizers include tertiary alkyl primary amines. The stabilizer may be present in the fuel composition at a concentration of about 0.001 to about 2 wt %, based on the total weight of the fuel composition, and in one embodiment from about 0.01 to about 1% by weight.

Combustion improvers increase the mass burning rate of the fuel composition. Some non-limiting examples of combustion improvers include ferrocene(dicyclopentadienyl iron), iron-based combustion improvers (e.g., TURBOTECT™ ER-18 from Turbotect (USA) Inc., Tomball, Tex.), barium-based combustion improvers, cerium-based combustion improvers, and iron and magnesium-based combustion improvers (e.g., TURBOTECT™ 703 from Turbotect (USA) Inc., Tomball, Tex.). The combustion improver may be present in the fuel composition at a concentration of about 0.001 to about 1 wt %, based on the total weight of the fuel composition, and in one embodiment from about 0.01 to about 1% by weight.

Antioxidants prevent the formation of gum depositions on fuel system components caused by oxidation of fuels in storage and/or inhibit the formation of peroxide compounds in certain fuel compositions can be used herein. The antioxidant may be present in the fuel composition at a concentration of about 0.001 to about 5 wt %, based on the total weight of the fuel composition, and in one embodiment from about 0.01 to about 1% by weight.

Static dissipaters reduce the effects of static electricity generated by movement of fuel through high flow-rate fuel transfer systems. The static dissipater may be present in the fuel composition at a concentration of about 0.001 to about 5 wt %, based on the total weight of the fuel composition, and in one embodiment from about 0.01 to about 1% by weight.

Corrosion inhibitors protect ferrous metals in fuel handling systems such as pipelines, and fuel storage tanks, from corrosion. In circumstances where additional lubricity is desired, corrosion inhibitors that also improve the lubricating properties of the composition can be used. The corrosion inhibitor may be present in the fuel composition at a concentration of about 0.001 to about 5 wt %, based on the total weight of the fuel composition, and in one embodiment from about 0.01 to about 1% by weight.

Fuel system icing inhibitors (also referred to as anti-icing additive) reduce the freezing point of water precipitated from jet fuels due to cooling at high altitudes and prevent the formation of ice crystals which restrict the flow of fuel to the engine. Certain fuel system icing inhibitors can also act as a biocide. The fuel system icing inhibitor may be present in the fuel composition at a concentration of about 0.001 to about 5 wt %, based on the total weight of the fuel composition, and in one embodiment from about 0.01 to about 1% by weight.

Biocides are used to combat microbial growth in the fuel composition. The biocide may be present in the fuel composition at a concentration of about 0.001 to about 5 wt %, based on the total weight of the fuel composition, and in one embodiment from about 0.01 to about 1% by weight.

Metal deactivators suppress the catalytic effect of some metals, particularly copper, have on fuel oxidation. The metal deactivator may be present in the fuel composition at a concentration of about 0.001 to about 5 wt %, based on the total weight of the fuel composition, and in one embodiment from about 0.01 to about 1% by weight.

Thermal stability improvers are use to inhibit deposit formation in the high temperature areas of the aircraft fuel system. The thermal stability improver may be present in the fuel composition at a concentration of about 0.001 to about 5 wt %, based on the total weight of the fuel composition, and in one embodiment from about 0.01 to about 1% by weight In some embodiments, the fuel compositions disclosed herein further comprise an aromatic compound. In some embodiments, the aromatic compound is or comprises an isoprenoid compound. In other embodiments, the aromatic compound is or comprises a $C_{10}$ isoprenoid compound.

In some embodiments, the aromatic compound is or comprises

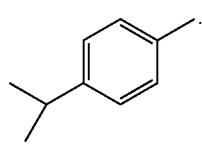

(11)

In other embodiments, the aromatic compound is or comprises

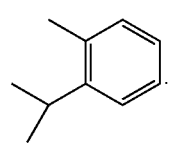

(12)

In certain embodiments, the aromatic compound is or comprises

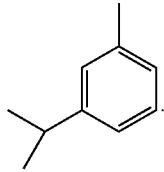

(13)

In some embodiments, the total amount of aromatic compounds in the fuel compositions is from about 1% to about 50% by weight or volume, based on the total weight or volume of the fuel composition. In other embodiments, the total amount of aromatic compounds in the fuel compositions is from about 10% to about 35% by weight or volume, based on the total weight or volume of the fuel compositions. In further embodiments, the total amount of aromatic compounds in the fuel compositions is from about 10% to about 25% by weight or volume, based on the total weight or volume of the fuel compositions. In still further embodiments, the total amount of aromatic compounds in the fuel compositions is less than about 25% by weight or volume, based on the total weight or volume of the fuel compositions.

In some embodiments, the fuel compositions disclosed herein further comprise a methylisopropylcyclohexane. In certain embodiments, the methylisopropylcyclohexane is:

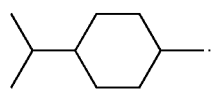

(14)

In other embodiments, the methylisopropylcyclohexane is or comprises one or more of the following compounds:

(15)

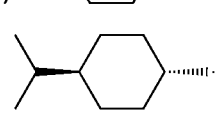

(16)

In certain other embodiments, the methylisopropylcyclohexane is or comprises

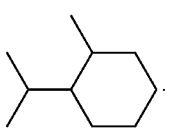

(17)

In other embodiments, the methylisopropylcyclohexane is or comprises one or more of the following compounds:

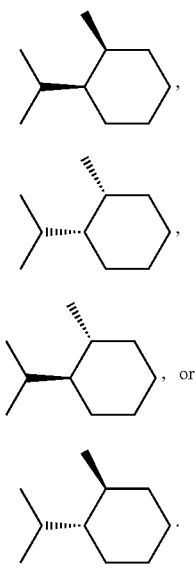

(18)

(19)

(20)

, or (21)

In another aspect, provided herein are fuel compositions comprising:

(a)

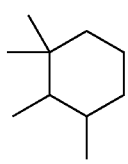

(1)

or at least a stereoisomer thereof;

(b)

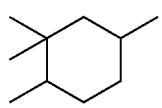

(2)

or at least a stereoisomer thereof;

(c)

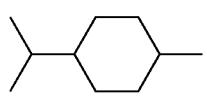

(14)

or at least a stereoisomer thereof; and (d)

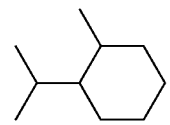

(17)

or at least a stereoisomer thereof, wherein (a), (b), (c), and (d) are each present in an amount of at least 0.5% by volume or weight, based on the total volume or weight of the fuel composition. In other embodiments, (a), (b), (c), and (d) are each present in an amount of at least 1% by volume or weight, based on the total volume or weight of the fuel composition.

In some embodiments, the fuel compositions disclosed herein further comprise an aromatic compound. In other embodiments, the aromatic compound is a $C_{10}$ isoprenoid selected from the group consisting of:

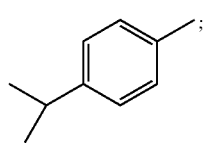

(11)

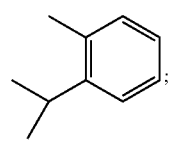

(12)

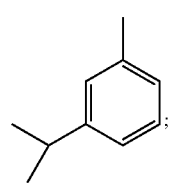

(13)

and combinations thereof.

In certain embodiments, the fuel compositions disclosed herein further comprise the following compounds:

(e)

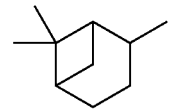

(24)

or at least one stereoisomer thereof;

(f)

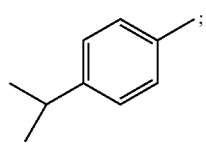

(11)

and (g)

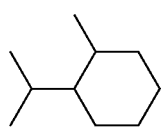 (27)

or at least one stereoisomer thereof.

In some embodiments, the fuel composition disclosed herein comprises (a)

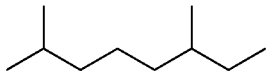 (1)

or at least one stereoisomer thereof;

(b)

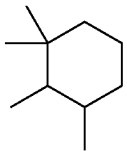 (2)

or at least one stereoisomer thereof;

(c)

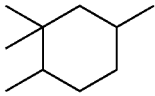 (14)

or at least one stereoisomer thereof;

(d)

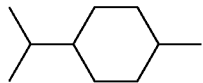 (17)

or at least one stereoisomer thereof;

(e)

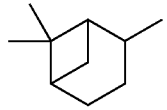 (24)

or at least one stereoisomer thereof;

(f)

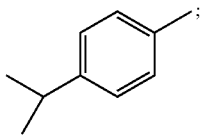 (11)

and (g)

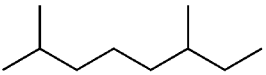 (27)

or at least one stereoisomer thereof.

In some embodiments, the amount of (a), (b), (c), (d), (e), (f) or (g) in wt. % or vol. % is from 0% to about 99%, from 0% to about 50%, from 0% to about 40%, from 0% to about 30%, from 0% to about 20%, from 0% to about 10%, from 0% to about 5%, from about 0.1% to about 99%, from about 0.1% to about 50%, from about 0.1% to about 40%, from about 0.1% to about 30%, from about 0.1% to about 20%, from about 0.1% to about 10%, from about 0.1% to about 5%, from about 0.5% to about 99%, from about 0.5% to about 50%, from about 0.5% to about 40%, from about 0.5% to about 30%, from about 0.5% to about 20%, from about 0.5% to about 10%, from about 0.5% to about 5%, from about 1% to about 99%, from about 1% to about 50%, from about 1% to about 40%, from about 1% to about 30%, from about 1% to about 20%, from about 1% to about 10%, from about 1% to about 5%, from about 50% to about 99%, from about 60% to about 99%, from about 70% to about 99%, from about 80% to about 99%, or from about 90% to about 99%, based on the total weight or volume of (a)-(d) or (a)-(g) or the fuel composition.

In other embodiments, the amount of (a), (b), (c), (d), (e), (f) or (g) in wt. % or vol. % is less than about 1%, less than about 3%, less than about 5%, less than about 10%, less than about 20%, less than about 30%, less than about 40%, less than about 50%, less than about 60%, less than about 70%, less than about 80%, less than about 85%, less than about 90%, or less than about 95%, based on the total weight or volume of (a)-(d) or (a)-(g) or the fuel composition.

In further embodiments, the amount of (a), (b), (c), (d), (e), (f) or (g) in wt. % or vol. % is at least about 0.1%, at least about 0.3%, at least about 0.5%, at least about 1%, at least about 3%, at least about 5%, at least about 10%, at least about 20%, at least about 30%, at least about 40%, at least about 50%, at least about 60%, at least about 60%, at least about 70%, at least about 80%, or at least about 90%, based on the total weight or volume of (a)-(d) or (a)-(g) or the fuel composition.

In some embodiments, the amount of (a) and (b) in wt. % or vol. % is from about 1% to about 99%, from about 10% to about 99%, from about 20% to about 99%, from about 30% to about 99%, from about 40% to about 99%, from about 50% to about 99%, from about 60% to about 99%, from about 70% to about 99%, from about 80% to about 99%, or from about 90% to about 99%, based on the total weight or volume of (a)-(d) or (a)-(g) or the fuel composition. In other embodiments, the total amount of (a) and (b) in wt. % or vol. % is at least about 0.5%, at least about 1%, at least about 10%, at least about 20%, at least about 30%, at least about 40%, at least about 50%, at least about 60%, at least about 70%, at least about 80%, or at least about 90%, based on the total weight or volume of (a)-(d) or (a)-(g) or the fuel composition.

In some embodiments, the amount of tetramethylcyclohexane in wt. % or vol. % is from about 1% to about 99%, from about 10% to about 99%, from about 20% to about 99%, from about 30% to about 99%, from about 40% to about 99%, from about 50% to about 99%, from about 60% to about 99%, from about 70% to about 99%, from about 80% to about 99%, or from about 90% to about 99%, based on the total weight or volume of (a)-(d) or (a)-(g) or the fuel composition. In other embodiments, the amount of tetramethylcyclohexane in wt. % or vol. % is at least about 0.5%, at least about 1%, at least about 10%, at least about 20%, at least about 30%, at least about 40%, at least about 50%, at least about 60%, at least about 70%, at least about 75%, at least about 80%, at least about 85%, at least about 90%, or at least about 95%, based on the total weight or volume of the fuel composition.

In certain embodiments, the total amount of (c) and (d) in wt. % or vol. % is from 0% to about 50%, from 0.1% to about 50%, from about 0.1% to about 40%, from about 0.1% to about 30%, from about 0.1% to about 20%, from about 0.1% to about 10%, from about 0.1% to about 5%, or from about 0% to about 5%, from 0.5% to about 50%, from about 0.5% to about 40%, from about 0.5% to about 30%, from about 0.5% to about 20%, from about 0.5% to about 10%, from about 0.5% to about 5%, or from about 0% to about 5%, based on the total weight or volume of (a)-(d) or (a)-(g) or the fuel composition. In other embodiments, the total amount of (c) and (d) in wt. % or vol. % is less than about 50%, less than about 40%, less than about 30%, less than about 20%, less than about 10%, less than about 5%, less than about 3%, or less than about 1%, based on the total weight or volume of (a)-(d) or (a)-(g) or the fuel composition.

In some embodiments, the amounts disclosed herein are in wt. % based on the total weight of (a)-(d). In other embodiments, the amounts disclosed herein are in wt. % based on the total weight of (a)-(g). In further embodiments, the amounts disclosed herein are in wt. % based on the total weight of the fuel composition. In certain embodiments, the amounts disclosed herein are in vol. % based on the total volume of (a)-(d). In other embodiments, the amounts disclosed herein are in vol. % based on the total volume of (a)-(g). In further embodiments, the amounts disclosed herein are in vol. % based on the total volume of the fuel composition.

In some embodiments, the fuel compositions further comprise a fuel component. In still other embodiments, the fuel component is or comprises a petroleum-based fuel component. In still other embodiments, the fuel component is or comprises a fuel additive.

Methods for Making Fuel Compositions

In another aspect, provided herein are methods of making a fuel composition comprising the steps of:

contacting pinene with hydrogen in the presence of a catalyst to form a tetramethylcyclohexane; and
mixing the tetramethylcyclohexane with a fuel component to make the fuel composition.

In some embodiments, the methods comprise the step of contacting pinene with hydrogen in the presence of a hydrogenation catalyst to form at least one tetramethylcyclohexane having a quaternary carbon atom in the cyclohexane ring.

In some embodiments, the pinene is α-pinene:

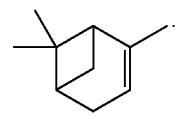

(22)

In other embodiments, the pinene is β-pinene:

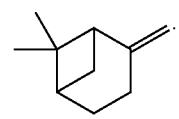

(23)

In some embodiments, the pinene is α-pinene, β-pinene or a combination thereof. In other embodiments, the pinene is made by host cells.

In certain embodiments, the hydrogenation of pinene to tetramethylcyclohexane is a one-pot reaction or synthesis. One-pot reaction or synthesis refers to a chemical process whereby a reactant is subjected to a single reaction or successive chemical reactions in just one reactor.

In other embodiments, the hydrogenation of pinene to tetramethylcyclohexane comprises two steps. In the first step, pinene is hydrogenated to pinane. Subsequently, pinane is further hydrogenated to tetramethylcyclohexane.

Whether hydrogenation is one pot reaction or comprises two or more different reactions, the hydrogenation typically occurs by reacting one or more of the reactants with hydrogen in the presence of a hydrogenation catalyst such as Pd, Pd/C, Pt, $PtO_2$, Rh, $Ru(PPh_3)_2Cl_2$, nickel, Raney nickel and combinations thereof. In some embodiments, the catalyst is a ruthenium catalyst such as Rh or $Ru(PPh_3)_2Cl_2$. In other embodiments, the catalyst is a rhodium catalyst such as Rh. In certain embodiments, the catalyst is a palladium catalyst such as Pd or Pd/C. In further embodiments, the catalyst is a platinum catalyst such as Pt or $PtO_2$. In further embodiments, the catalyst is a nickel catalyst such as nickel or Raney nickel.

The hydrogenation catalyst can have a surface area between about 25 $m^2/g$ and about 300 $m^2/g$. In some embodiments, the surface area of the hydrogenation catalyst is between about 50 $m^2/g$ and about 250 $m^2/g$. In other embodiments, the surface area of the hydrogenation catalyst is between about 70 $m^2/g$ and about 250 $m^2/g$. In further embodiments, the surface area of the hydrogenation catalyst is between about 50 $m^2/g$ and about 200 $m^2/g$. In certain embodiments, the surface area of the hydrogenation catalyst is between about 70 $m^2/g$ and about 150 $m^2/g$. The hydrogenation catalyst can have an average particle size ranging from about 5 to about 300 microns, from about 20 to about 250 microns, from about 20 to about 200 microns, from about 20 to about 150 microns, from about 20 to about 120 microns, from about 30 to about 100 microns, or from about 30 to about 90 microns.

The hydrogenation catalyst can be distributed, coated, deposited or supported on a support material. Any support material which is known in the art to be suitable as a support for hydrogenation catalyst can be used herein. Non-limiting examples of suitable support materials include carbon such as activated carbon, alumina such as activated alumina or microgel alumina, silica, silica-alumina, alumina silicates, magnesia, kieselguhr, fuller's earth, clays, porous rare earth halides and oxylalides, and combinations thereof.

The support material can be in the form of particles have a surface area between about 5 m²/g and about 450 m²/g. In some embodiments, the surface area of the support material is between about 10 m²/g and about 400 m²/g. In further embodiments, the surface area of the support material is between about 15 m²/g and about 350 m²/g. In certain embodiments, the surface area of the support material is between about 20 m²/g and about 300 m²/g. The support material can have an average particle size ranging from about 5 to about 300 microns, from about 10 to about 250 microns, from about 15 to about 200 microns, from about 20 to about 150 microns, or from about 20 to about 120 microns.

The surface area of the hydrogenation catalyst or the support material can be determined by the BET (Brunauer-Emmet-Teller) method of measuring surface area, as described by S. Brunauer, P. H. Emmett, and E. Teller, Journal of the American Chemical Society, 60, 309 (1938), which is incorporated herein by reference. The average particle sizes of the hydrogenation catalyst or the support material can be measured by any particle size measurement method known to a skilled artisan. For example, the average particle size of the support material can be obtained by ASTM D4460-00 or any similar method known to a person skilled in the art.

Generally, after completion of the hydrogenation, the reaction mixture can be washed, concentrated, and dried to yield the desired hydrogenated product. Alternatively, any reducing agent that can reduce a C=C bond to a C—C bond can also be used. An illustrative example of such a reducing agent is hydrazine in the presence of a catalyst, such as 5-ethyl-3-methyllumiflavinium perchlorate, under an oxygen atmosphere. The reduction reaction with hydrazine is disclosed in Imada et al., *J. Am. Chem. Soc.*, 127, 14544-14545 (2005), which is incorporated herein by reference.

In other embodiments, the hydrogenation reaction is carried out in the presence of an asymmetric hydrogenation catalyst such as rhodium-chiral diphosphine complex to form stereospecific hydrogenated products substantially free of other stereoisomers. A non-limiting example of the asymmetric hydrogenation catalyst includes the rhodium-DIPAMP catalyst. The rhodium-DIPAMP catalyst and other asymmetric hydrogenation catalysts are disclosed in Vineyard et al., *J. Am. Chem. Soc.* 1977, 99, (18), 5946; Ryoji Noyori, "Asymmetric Catalysis In Organic Synthesis," John Wiley & Sons Inc., New York, Chapter 2, pp. 16-94 (1994); and Blaser et al., "Asymmetric Catalysis on Industrial Scale: Challenges, Approaches and Solutions," Wiley-VCH, Weinheim, pp. 23-52 (2004), all of which are incorporated herein by reference in their entirety.

In some embodiments, the hydrogenation reaction occurs in two steps. In the first step, as shown in Scheme 1.

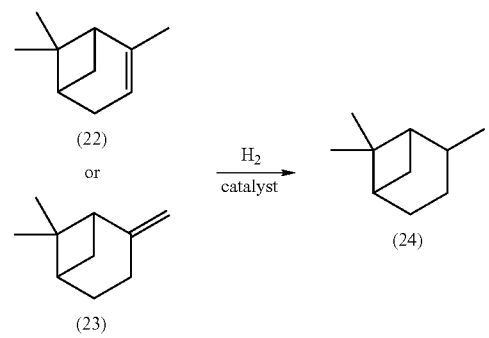

In other embodiments, α-pinene or β-pinene can be hydrogenated in the presence of an asymmetric hydrogenation catalyst to form preferentially or substantially one of two possible stereoisomers of pinane, as shown below:

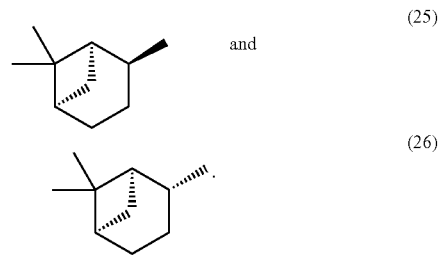

Once pinene is converted to pinane, a subsequent hydrogenation reaction can convert pinane to one or more tetramethylcyclohexanes as shown in Scheme 2.

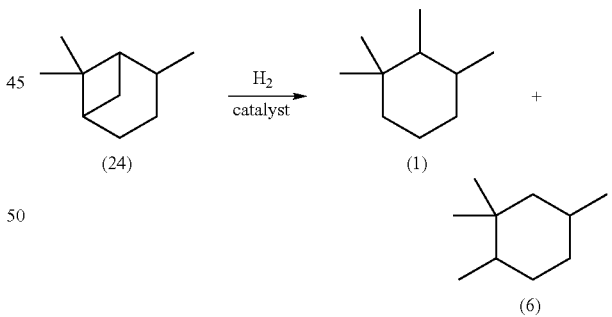

In some embodiments, the same catalyst and reaction conditions for the first step is used in the second step. In other embodiments, a different catalyst is used for the second hydrogenation reaction. In still other embodiments, the same catalyst is used but different reaction conditions are applied. In further embodiments, the conversion of pinene to one or more tetramethylcyclohexanes occurs in a one-pot reaction. In still further embodiments, the conversion of pinene to one or more tetramethylcyclohexanes occurs in a single step reaction wherein pinane is an intermediate of the single step reaction.

Depending on the temperature and pressure of the reaction of Scheme 2, the reaction may yield additional products such as:

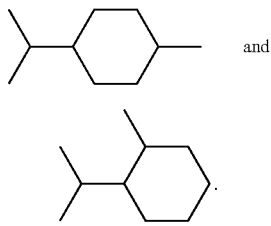

(14) and (17)

Another additional product of the reaction of Scheme 2 may be dimethyloctane:

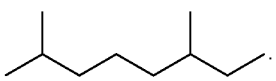

(27)

In certain embodiments, the pinane is trans-pinane (25). In other embodiments, the pinane is cis-pinane (26). In still other embodiments, the pinane is a mixture of cis-pinane (26) and trans-pinane (25).

In another aspect, provided herein are methods of making a fuel composition from a sugar or a non-fermentable carbon source, comprising the steps of:
  (a) contacting a cell capable of making pinene with the sugar under conditions suitable for making pinene;
  (b) converting the pinene to pinane;
  (c) converting the pinane to at least a tetramethylcyclohexane; and,
  (d) mixing the tetramethylcyclohexane with a fuel component to make the fuel composition.

The sugar can be any sugar known to those of skill in the art. Some non-limiting examples of suitable monosaccharides include glucose, galactose, mannose, fructose, ribose and combinations thereof. Some non-limiting examples of suitable disaccharides include sucrose, lactose, maltose, trehalose, cellobiose and combinations thereof. In certain embodiments, the bioengineered fuel component can be obtained from a polysaccharide. Some non-limiting examples of suitable polysaccharides include starch, glycogen, cellulose, chitin and combinations thereof.

The monosaccharides, disaccharides and polysaccharides suitable for making the bioengineered tetramethylcyclohexane can be found in a wide variety of crops or sources. Some non-limiting examples of suitable crops or sources include sugar cane, bagasse, miscanthus, sugar beet, sorghum, grain sorghum, switchgrass, barley, hemp, kenaf, potatoes, sweet potatoes, cassava, sunflower, fruit, molasses, whey or skim milk, corn, stover, grain, wheat, wood, paper, straw, cotton, many types of cellulose waste, and other biomass. In certain embodiments, the suitable crops or sources include sugar cane, sugar beet and corn.

A non-fermentable carbon source is a carbon source that cannot be converted by the organism into ethanol. Some non-limiting examples of suitable non-fermentable carbon sources include acetate and glycerol.

Methods for Making Compounds

The compounds of the present invention can be made using any method known in the art including biologically, total chemical synthesis (without the use of biologically derived materials), and a hybrid method where both biologically and chemical means are used.

Aromatic Isoprenoid Compounds

In certain embodiments, the inventive fuel compositions comprise an aromatic isoprenoid compound. Some illustrative examples of suitable aromatic isoprenoid compounds include:

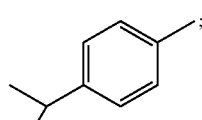

(11)

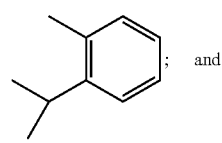

(12) and

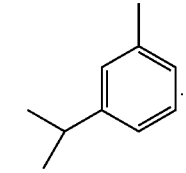

(13)

In some embodiments, the aromatic isoprenoid compound is made by converting an isoprenoid starting material into the corresponding aromatic compound by hydrogenation catalysts at a reaction temperature between about 300° C. to about 350° C. Some illustrative examples of suitable hydrogenation catalysts include but are not limited to platinum, palladium, and nickel. In general, milder conditions can be used if a hydrogen acceptor is present to remove hydrogen as it is formed.

In certain embodiments, the catalyst is platinum on activated alumina. In other embodiments, the catalyst is 5% platinum on activated alumina. In further embodiments, the catalyst loading is from about 1 gram per liter of substrate to about 50 grams per liter of substrate. In other embodiments, the catalyst loading is less than about 25 grams per liter of substrate. In other embodiments, the catalyst loading is less than about 10 grams per liter of substrate.

In other embodiments, the aromatic compound is or comprises both

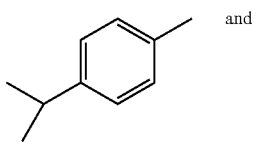

(11) and

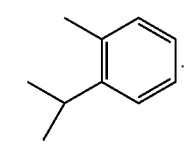

(12)

In certain other embodiments, compounds 11 and 12 are made according to Scheme 3.

Scheme 3

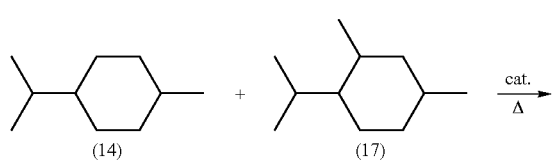

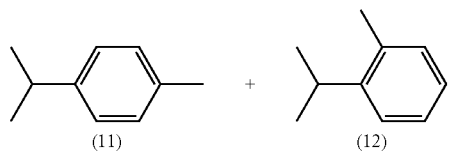

In some embodiments, compounds 14 and 17 are derived from the hydrogenation reaction of pinene.

In other embodiments, the aromatic compound is or comprises

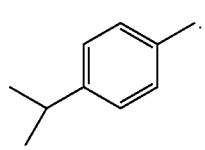

In certain other embodiments, compound 11 is made according to Scheme 4 from limonene or γ-terpinene or terpinolene.

Scheme 4

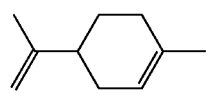

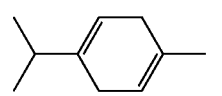 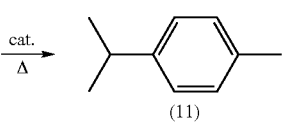

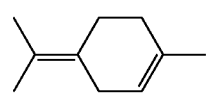

In other embodiments, the aromatic compound is or comprises

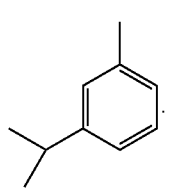

In certain other embodiments, compound 13 is made according to Scheme 5 from sabinene.

Scheme 5

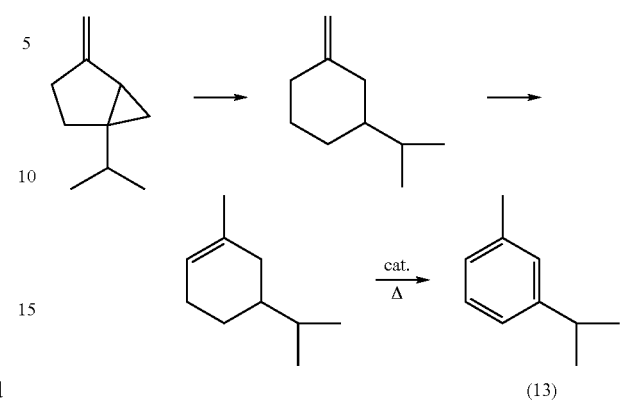

The first step of Scheme 5 is a ring-opening reaction. Because of its strained bicyclic structure, isoprenoids like sabinane generally can be converted by reductive ring-opening reactions to the corresponding less strained monocyclic alkanes. Any reductive ring-opening reagent that can reductively ring open a bicyclic alkane to the corresponding monocyclic alkane can be used herein. Some non-limiting examples of suitable reductive ring-opening reagents include hydrides such as diisobutylaluminum hydride; hydrogen in the presence of a suitable catalyst; and asymmetric reductive ring agents such as a mixture of an organic acid, zinc powder and Ni(binap)Cl2 or Pd(binap)I2 as catalyst, where binap is 2,2'-bis(diphenylphosphino)-1,1'-binaphthyl. Some of these asymmetric reductive ring agents are disclosed in Lautens, et al., "Scope of the Nickel Catalyzed Asymmetric Reductive Ring Opening Reaction. Synthesis of Enantiomerically Enriched Cyclohexenols," *Tetrahedron*, 54, 1107-1116 (1998); and Li et al., "Asymmetric Reductive Ring-Opening of Bicyclic Olefins Catalyzed by Palladium and Nickel Complexes," *Org. Lett.*, 5(10), 1621-1624, 2003, both of which are incorporated herein by reference. Once sabinene is converted into its corresponding monocyclic structure, it can be aromatized as described previously.

In some embodiments, limonene, pinene, sabinene, and γ-terpinene are each made from renewable sources, namely by the conversion of a carbon source such as sugar to the desired isoprenoid starting material by host cells.

Host Cell

A $C_{10}$ isoprenoid compound or starting material can be made by any method known in the art including biological methods, chemical syntheses, and hybrid methods. When the $C_{10}$ isoprenoid compound or starting material is made biologically, one method is where a host cell that has been modified to produce the desired product. Like all isoprenoids, a $C_{10}$ isoprenoid compound or starting material is made biochemically through a common intermediate, isopentenyl diphosphate ("IPP") or dimethylallyl pyrophosphate ("DMAPP").

Any suitable host cell may be used in the practice of the present invention. In one embodiment, the host cell is a genetically modified host microorganism in which nucleic acid molecules have been inserted, deleted or modified (i.e., mutated; e.g., by insertion, deletion, substitution, and/or inversion of nucleotides), to either produce the desired isoprenoid compound or starting material, or increased yields of the desired isoprenoid compound or starting material. In another embodiment, the host cell is capable of being grown in liquid growth medium.

Illustrative examples of suitable host cells include any archae, bacterial, or eukaryotic cell. Examples of an archae cell include, but are not limited to those belong to the genera: *Aeropyrum, Archaeglobus, Halobacterium, Methanococcus, Methanobacterium, Pyrococcus, Sulfolobus,* and *Thermoplasma*. Illustrative examples of archae species include but are not limited to: *Aeropyrum pernix, Archaeoglobus fulgidus, Methanococcus jannaschii, Methanobacterium thermoautotrophicum, Pyrococcus abyssi, Pyrococcus horikoshii, Thermoplasma acidophilum,* and *Thermoplasma volcanium*.

Examples of a bacterial cell include, but are not limited to those belonging to the genera: *Agrobacterium, Alicyclobacillus, Anabaena, Anacystis, Arthrobacter, Azobacter, Bacillus, Brevibacterium, Chromatium, Clostridium, Corynebacterium, Enterobacter, Erwinia, Escherichia, Lactobacillus, Lactococcus, Mesorhizobium, Methylobacterium, Microbacterium, Phormidium, Pseudomonas, Rhodobacter, Rhodopseudomonas, Rhodospirillum, Rhodococcus, Salmonella, Scenedesmun, Serratia, Shigella, Staphlococcus, Stremomyces, Synnecoccus,* and *Zymomonas*.

Illustrative examples of bacterial species include but are not limited to: *Bacillus subtilis, Bacillus amyloliquefacines, Brevibacterium ammoniagenes, Brevibacterium immariophilum, Clostridium beigerinckii, Enterobacter sakazakii, Escherichia coli, Lactococcus lactis, Mesorhizobium loti, Pseudomonas aeruginosa, Pseudomonas mevalonii, Pseudomonas pudica, Rhodobacter caps ulatus, Rhodobacter sphaero ides, Rhodospirillum rubrum, Salmonella enterica, Salmonella typhi, Salmonella typhimurium, Shigella dysenteriae, Shigellaflexneri, Shigella sonnei, Staphylococcus aureus,* and the like.

In general, if a bacterial host cell is used, a non-pathogenic strain is preferred. Illustrative examples of non-pathogenic species include but are not limited to: *Bacillus subtilis, Escherichia coli, Lactibacillus acidophilus, Lactobacillus helveticus, Pseudomonas aeruginosa, Pseudomonas mevalonii, Pseudomonas pudita, Rhodobacter sphaeroides, Rodobacter capsulatus, Rhodospirillum rubrum,* and the like.

Examples of eukaryotic cells include but are not limited to fungal cells. Examples of fungal cell include, but are not limited to those belonging to the genera: *Aspergillus, Candida, Chrysosporium, Cryotococcus, Fusarium, Kluyveromyces, Neotyphodium, Neurospora, Penicillium, Pichia, Saccharomyces,* and *Trichoderma.*

Illustrative examples of eukaryotic species include but are not limited to: *Aspergillus nidulans, Aspergillus niger, Aspergillus oryzae, Candida albicans, Chrysosporium lucknowense, Fusarium graminearum, Fusarium venenatum, Kluyveromyces lactis, Neurospora crassa, Pichia angusta, Pichia finlandica, Pichia kodamae, Pichia membranaefaciens, Pichia methanolica, Pichia opuntiae, Pichia pastoris, Pichia piperi, Pichia quercuum, Pichia salictaria, Pichia thermotolerans, Pichia trehalophila, Pichia stipitis, Streptomyces ambofaciens, Streptomyces aureofaciens, Streptomyces aureus, Saccaromyces bayanus, Saccaromyces boulardi, Saccharomyces cerevisiae, Streptomyces fungicidicus, Streptomyces griseochromogenes, Streptomyces griseus, Streptomyces lividans, Streptomyces olivogriseus, Streptomyces rameus, Streptomyces tanashiensis, Streptomyces vinaceus,* and *Trichoderma reesei.*

In general, if a eukaryotic cell is used, a non-pathogenic species is preferred. Illustrative examples of non-pathogenic species include but are not limited to: *Fusarium graminearum, Fusarium venenatum, Pichia pastoris, Saccaromyces boulardi,* and *Saccaromyces cerevisiae.*

In addition, certain species have been designated by the Food and Drug Administration as GRAS or Generally Regarded As Safe. These strains include: *Bacillus subtilis, Lactibacillus acidophilus, Lactobacillus helveticus,* and *Saccharomyces cerevisiae.*

IPP Pathways

There are two known biosynthetic pathways that synthesize IPP and its isomer, dimethylallyl pyrophosphate ("DMAPP"). Eukaryotes other than plants use the mevalonate-dependent ("MEV") isoprenoid pathway exclusively to convert acetyl-coenzyme A ("acetyl-CoA") to IPP, which is subsequently isomerized to DMAPP. Prokaryotes, with some exceptions, use the mevalonate-independent or deoxyxylulose 5-phosphate ("DXP") pathway to produce IPP and DMAPP separately through a branch point. In general, plants use both the MEV and DXP pathways for IPP synthesis.

MEV Pathway

A schematic representation of the MEV pathway is described in FIG. 1. In general, the pathway comprises six steps.

In the first step, two molecules of acetyl-coenzyme A are enzymatically combined to form acetoacetyl-CoA. An enzyme known to catalyze this step is, for example, acetyl-CoA thiolase. Illustrative examples of nucleotide sequences include but are not limited to the following GenBank accession numbers and the organism from which the sequences derived: (NC_000913 REGION: 2324131 . . . 2325315; *Escherichia coli*), (D49362; *Paracoccus denitrificans*), and (L20428; *Saccharomyces cerevisiae*).

In the second step of the MEV pathway, acetoacetyl-CoA is enzymatically condensed with another molecule of acetyl-CoA to form 3-hydroxy-3-methylglutaryl-CoA (HMG-CoA). An enzyme known to catalyze this step is, for example, HMG-CoA synthase. Illustrative examples of nucleotide sequences include but are not limited to: (NC_001145. complement 19061 . . . 20536; *Saccharomyces cerevisiae*), (X96617; *Saccharomyces cerevisiae*), (X83882; *Arabidopsis thaliana*), (AB037907; *Kitasatospora griseola*), (BT007302; *Homo sapiens*), and (NC_002758, Locus tag SAV2546, GeneID 1122571; *Staphylococcus aureus*).

In the third step, HMG-CoA is enzymatically converted to mevalonate. An enzyme known to catalyze this step is, for example, HMG-CoA reductase. Illustrative examples of nucleotide sequences include but are not limited to: (NM_206548; *Drosophila melanogaster*), (NC_002758, Locus tag SAV2545, GeneID 1122570; *Staphylococcus aureus*), (NM_204485; *Gallus gallus*), (AB015627; *Streptomyces* sp. KO 3988), (AF542543; *Nicotiana attenuata*), (AB037907; *Kitasatospora griseola*), (AX128213, providing the sequence encoding a truncated HMGR; *Saccharomyces cerevisiae*), and (NC_001145: complement (115734 . . . 118898; *Saccharomyces cerevisiae*).

In the fourth step, mevalonate is enzymatically phosphorylated to form mevalonate 5-phosphate. An enzyme known to catalyze this step is, for example, mevalonate kinase. Illustrative examples of nucleotide sequences include but are not limited to: (L77688; *Arabidopsis thaliana*), and (X55875; *Saccharomyces cerevisiae*).

In the fifth step, a second phosphate group is enzymatically added to mevalonate 5-phosphate to form mevalonate 5-pyrophosphate. An enzyme known to catalyze this step is, for example, phosphomevalonate kinase. Illustrative examples of nucleotide sequences include but are not limited to:

(AF429385; *Hevea brasiliensis*), (NM_006556; *Homo sapiens*), and (NC_001145. complement 712315 . . . 713670; *Saccharomyces cerevisiae*).

In the sixth step, mevalonate 5-pyrophosphate is enzymatically converted into IPP. An enzyme known to catalyze this step is, for example, mevalonate pyrophosphate decarboxylase. Illustrative examples of nucleotide sequences include but are not limited to: (X97557; *Saccharomyces cerevisiae*), (AF290095; *Enterococcus faecium*), and (U49260; *Homo sapiens*).

If IPP is to be converted to DMAPP using the mevalonate pathway, then a seventh step is required. An enzyme known to catalyze this step is, for example, IPP isomerase. Illustrative examples of nucleotide sequences include but are not limited to: (NC_000913, 3031087 . . . 3031635; *Escherichia coli*), and (AF082326; *Haematococcus pluvialis*).

DXP Pathway

Figure 2:
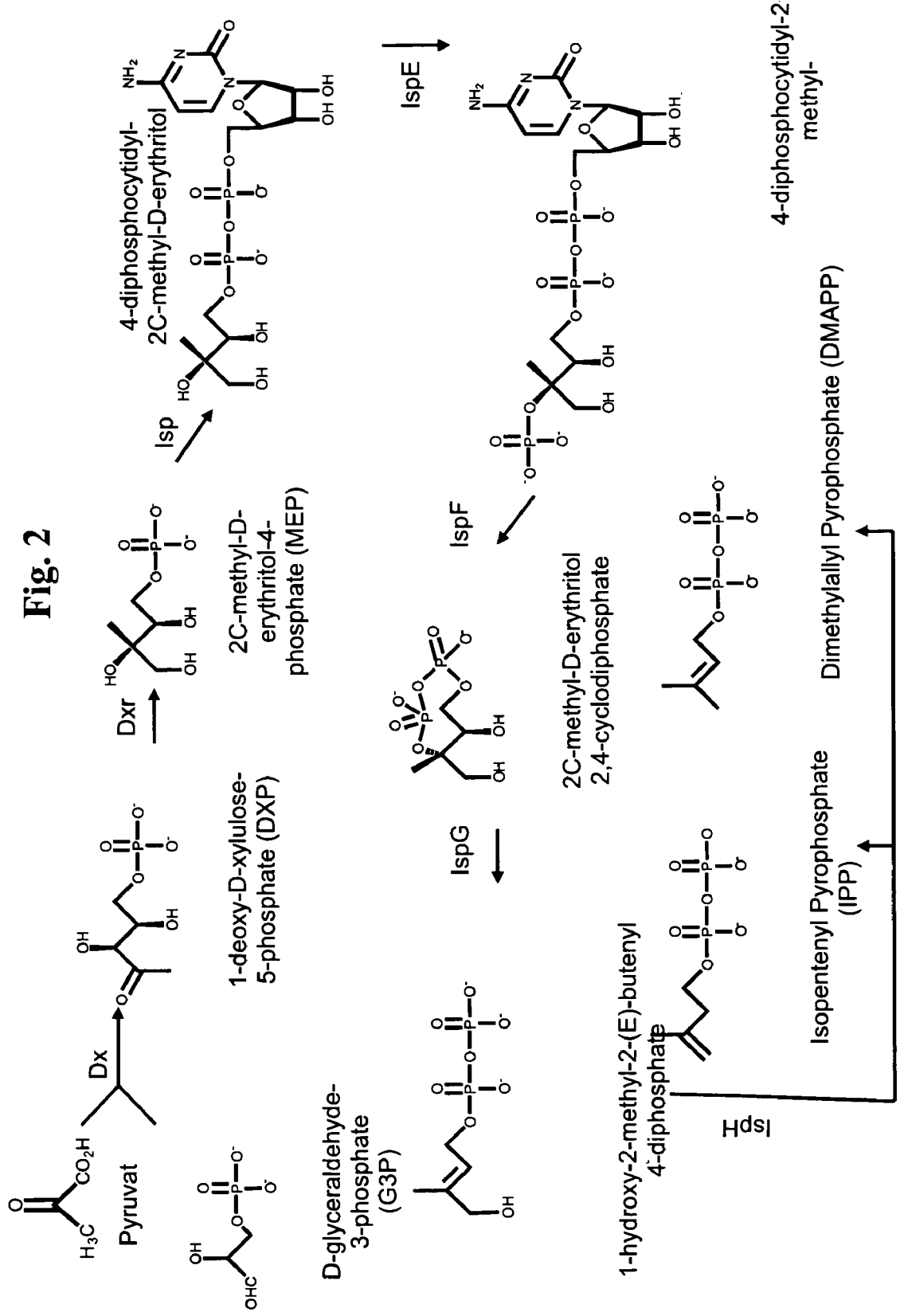
FIG. 2 is a schematic representation of the DXP pathway for the production of IPP and dimethylallyl pyrophosphate ("DMAPP"). Dxs is 1-deoxy-D-xylulose-5-phosphate synthase; Dxr is 1-deoxy-D-xylulose-5-phosphate reductoisomerase (also known as IspC); IspD is 4-diphosphocytidyl-2C-methyl-D-erythritol synthase; IspE is 4-diphosphocytidyl-2C-methyl-D-erythritol synthase; IspF is 2C-methyl-D-erythritol 2,4-cyclodiphosphate synthase; IspG is 1-hydroxy-2-methyl-2-(E)-butenyl 4-diphosphate synthase (IspG); and ispH is isopentenyl/dimethylallyl diphosphate synthase.

A schematic representation of the DXP pathway is described in FIG. 2. In general, the DXP pathway comprises seven steps. In the first step, pyruvate is condensed with D-glyceraldehyde 3-phosphate to make 1-deoxy-D-xylulose-5-phosphate. An enzyme known to catalyze this step is, for example, 1-deoxy-D-xylulose-5-phosphate synthase. Illustrative examples of nucleotide sequences include but are not limited to: (AF035440; *Escherichia coli*), (NC_002947, locus tag PP0527; *Pseudomonas putida* KT2440), (CP000026, locus tag SPA2301; *Salmonella enterica Paratyphi*, see ATCC 9150), (NC_007493, locus tag RSP_0254; *Rhodobacter sphaeroides* 2.4.1), (NC_005296, locus tag RPA0952; *Rhodopseudomonas palustris* CGA009), (NC_004556, locus tag PD1293; *Xylella fastidiosa Temecula*1), and (NC_003076, locus tag AT5G11380; *Arabidopsis thaliana*).

In the second step, 1-deoxy-D-xylulose-5-phosphate is converted to 2C-methyl-D-erythritol-4-phosphate. An enzyme known to catalyze this step is, for example, 1-deoxy-D-xylulose-5-phosphate reductoisomerase. Illustrative examples of nucleotide sequences include but are not limited to: (AB013300; *Escherichia coli*), (AF148852; *Arabidopsis thaliana*), (NC_002947, locus tag PP1597; *Pseudomonas putida* KT2440), (AL939124, locus tag SCO5694; *Streptomyces coelicolor* A3(2)), (NC_007493, locus tag RSP_2709; *Rhodobacter sphaeroides* 2.4.1), and (NC_007492, locus tag Pfl_1107; *Pseudomonas fluorescens* PfO-1).

In the third step, 2C-methyl-D-erythritol-4-phosphate is converted to 4-diphosphocytidyl-2C-methyl-D-erythritol. An enzyme known to catalyze this step is, for example, 4-diphosphocytidyl-2C-methyl-D-erythritol synthase. Illustrative examples of nucleotide sequences include but are not limited to: (AF230736; *Escherichia coli*), (NC_007493, locus tag RSP_2835; *Rhodobacter sphaeroides* 2.4.1), (NC_003071, locus_tag AT2G02500; *Arabidopsis thaliana*), and (NC_002947, locus_tag PP1614; *Pseudomonas putida* KT2440).

In the fourth step, 4-diphosphocytidyl-2C-methyl-D-erythritol is converted to 4-diphosphocytidyl-2C-methyl-D-erythritol-2-phosphate. An enzyme known to catalyze this step is, for example, 4-diphosphocytidyl-2C-methyl-D-erythritol kinase. Illustrative examples of nucleotide sequences include but are not limited to: (AF216300; *Escherichia coli*) and (NC_007493, locus_tag RSP_1779; *Rhodobacter sphaeroides* 2.4.1).

In the fifth step, 4-diphosphocytidyl-2C-methyl-D-erythritol-2-phosphate is converted to 2C-methyl-D-erythritol 2,4-cyclodiphosphate. An enzyme known to catalyze this step is, for example, 2C-methyl-D-erythritol 2,4-cyclodiphosphate synthase. Illustrative examples of nucleotide sequences include but are not limited to: (AF230738; *Escherichia coli*), (NC_007493, locus_tag RSP_6071; *Rhodobacter sphaeroides* 2.4.1), and (NC_002947, locus_tag PP1618; *Pseudomonas putida* KT2440).

In the sixth step, 2C-methyl-D-erythritol 2,4-cyclodiphosphate is converted to 1-hydroxy-2-methyl-2-(E)-butenyl-4-diphosphate. An enzyme known to catalyze this step is, for example, 1-hydroxy-2-methyl-2-(E)-butenyl-4-diphosphate synthase. Illustrative examples of nucleotide sequences include but are not limited to: (AY033515; *Escherichia coli*), (NC_002947, locus_tag PP0853; *Pseudomonas putida* KT2440), and (NC_007493, locus_tag RSP_2982; *Rhodobacter sphaeroides* 2.4.1).

In the seventh step, 1-hydroxy-2-methyl-2-(E)-butenyl-4-diphosphate is converted into either IPP or its isomer, DMAPP. An enzyme known to catalyze this step is, for example, isopentyl/dimethylallyl diphosphate synthase. Illustrative examples of nucleotide sequences include but are not limited to: (AY062212; *Escherichia coli*) and (NC_002947, locus_tag PP0606; *Pseudomonas putida* KT2440).

In some embodiments, "cross talk" (or interference) between the host cell's own metabolic processes and those processes involved with the production of IPP as provided by the present invention are minimized or eliminated entirely. For example, cross talk is minimized or eliminated entirely when the host microorganism relies exclusively on the DXP pathway for synthesizing IPP, and a MEV pathway is introduced to provide additional IPP. Such a host organisms would not be equipped to alter the expression of the MEV pathway enzymes or process the intermediates associated with the MEV pathway. Organisms that rely exclusively or predominately on the DXP pathway include, for example, *Escherichia coli*.

In some embodiments, the host cell produces IPP via the MEV pathway, either exclusively or in combination with the DXP pathway. In other embodiments, a host's DXP pathway is functionally disabled so that the host cell produces IPP exclusively through a heterologously introduced MEV pathway. The DXP pathway can be functionally disabled by disabling gene expression or inactivating the function of one or more of the DXP pathway enzymes.

In some embodiments, the host cell produces IPP via the DXP pathway, either exclusively or in combination with the MEV pathway. In other embodiments, a host's MEV pathway is functionally disabled so that the host cell produces IPP exclusively through a heterologously introduced DXP pathway. The MEV pathway can be functionally disabled by disabling gene expression or inactivating the function of one or more of the MEV pathway enzymes.

$C_{10}$ Isoprenoid Compound or Starting Material

Figure 3:
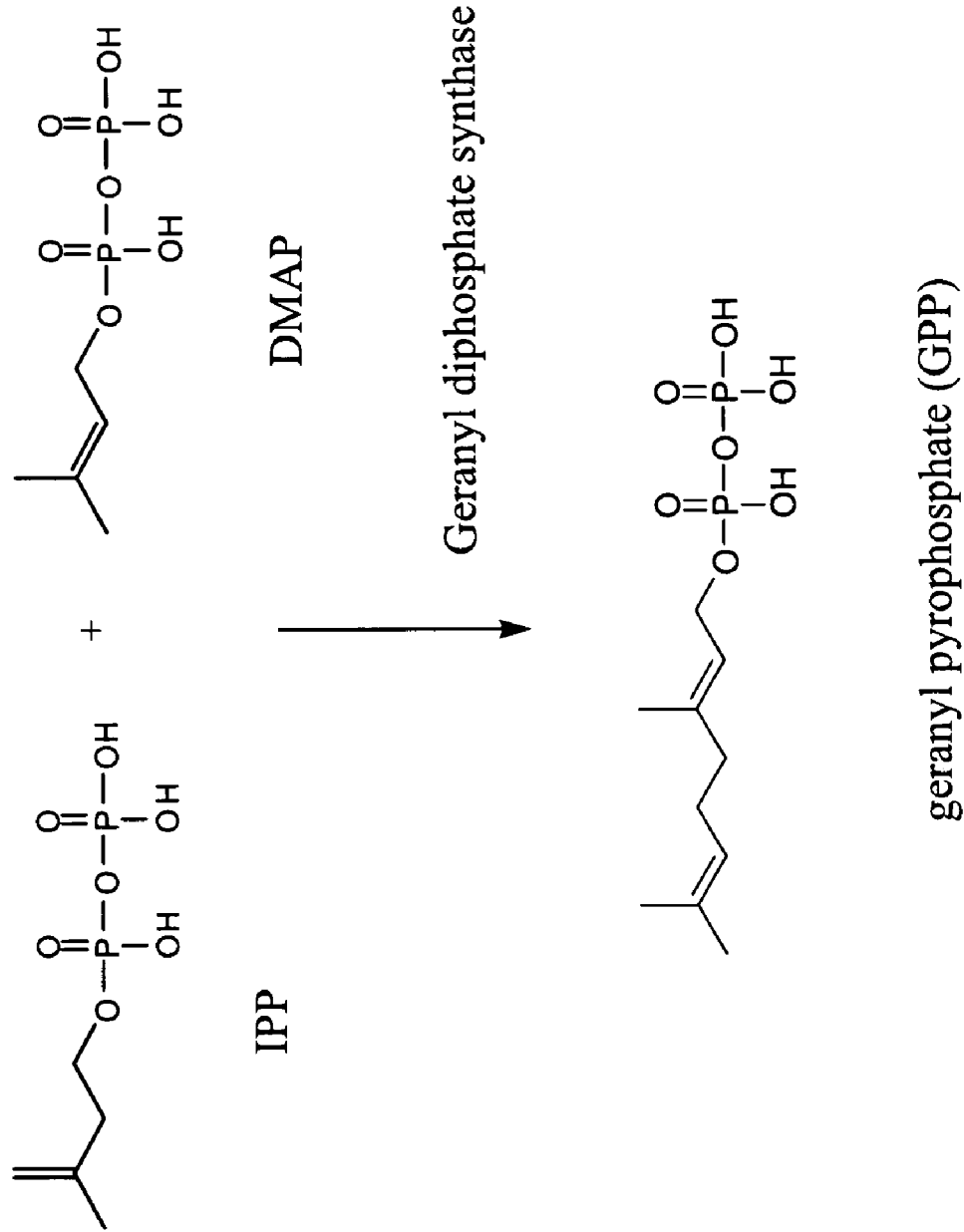
FIG. 3 is a schematic representation of the conversion of one molecule of IPP and one molecule of DMAPP to geranyl diphosphate ("GPP"). An enzyme known to catalyze this step is, for example, geranyl diphosphate synthase.

In some embodiments GPP is prepared by the method as described schematically in FIG. 3. One molecule of IPP and one molecule of DMAPP are condensed to form GPP. In some embodiments, the reaction can be catalyzed by an enzyme known to catalyze this step, for example, geranyl diphosphate synthase. Various $C_{10}$ isoprenoid starting materials can be made from GPP.

Illustrative examples of nucleotide sequences for geranyl pyrophosphate synthase include but are not limited to: (AF513111; *Abies grandis*), (AF513112; *Abies grandis*), (AF513113; *Abies grandis*), (AY534686; *Antirrhinum majus*), (AY534687; *Antirrhinum majus*), (Y17376; *Arabidopsis thaliana*), (AE016877, Locus AP11092; *Bacillus cereus*; ATCC 14579), (AJ243739; *Citrus sinensis*), (AY534745; *Clarkia breweri*), (AY953508; *Ips pini*), (DQ286930; *Lycopersicon esculentum*), (AF182828; *Mentha x piperita*), (AF182827; *Mentha x piperita*), (MPI249453; *Mentha x piperita*), (PZE431697, Locus CAD24425; *Paracoccus zeaxanthinifaciens*), (AY866498; *Picrorhiza kurrooa*), (AY351862; *Vitis vinifera*), and (AF203881, Locus AAF12843; *Zymomonas mobilis*).

GPP is then subsequently converted to various $C_{10}$ isoprenoid starting materials using one or more terpene synthases.

Limonene

Limonene, whose structure is

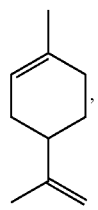

is found in the rind of citrus fruits and peppermint. Limonene is made from GPP by limonene synthase. Illustrative examples of suitable nucleotide sequences include but are not limited to: (+)-limonene synthases (AF514287, REGION: 47 . . . 1867; *Citrus limon*) and (AY055214, REGION: 48 . . . 1889; *Agastache rugosa*) and (−)-limonene synthases (DQ195275, REGION: 1 . . . 1905; *Picea sitchensis*), (AF006193, REGION: 73 . . . 1986; *Abies grandis*), and (MHC4SLSP, REGION: 29 . . . 1828; *Mentha spicata*).

α-Pinene

α-Pinene having the following structure:

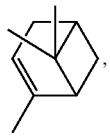

is a constituent of the essential oils from numerous Coniferaceae species. Biochemically, α-pinene is made from GPP by a α-pinene synthase. Some non-limiting examples of suitable nucleotide sequences include GenBank accession numbers AF543530, REGION: 1 . . . 1887 ((+)-α-pinene) from *Pinus taeda* and AF543527, REGION: 32 . . . 1921 ((−)-α-pinene) from *Pinus taeda*.

β-Pinene

β-Pinene having the following structure:

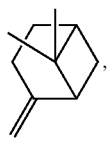

is a constituent of oil of turpentine. Biochemically, β-pinene is made from GPP by a β-pinene synthase. Some non-limiting examples of suitable nucleotide sequences include GenBank accession numbers AF276072, REGION: 1 . . . 1749 from *Artemisia annua* and AF514288, REGION: 26 . . . 1834 from *Citrus limon*.

Sabinene

Sabinene having the following structure:

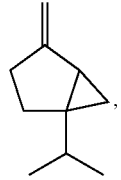

is a constituent of the essential oil from *Juniperus Sabina*. Biochemically, sabinene is made from GPP by a sabinene synthase. A non-limiting example of a suitable nucleotide sequence includes GenBank accession number AF051901, REGION: 26 . . . 1798 from *Salvia officinalis*.

γ-Terpinene

γ-Terpinene, whose structure is

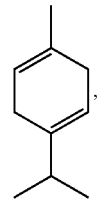

is a constituent of the essential oil from citrus fruits. Biochemically, γ-terpinene is made from GPP by a γ-terpinene synthase. Illustrative examples of suitable nucleotide sequences include: (AF514286, REGION: 30 . . . 1832 from *Citrus limon*) and (AB110640, REGION 1 . . . 1803 from *Citrus unshiu*).

Terpinolene

Terpinolene, whose structure is

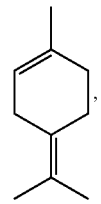

is found in black currant, cypress, guava, lychee, papaya, pine, and tea. Terpinolene is made from GPP by terpinolene synthase. Illustrative examples of a suitable nucleotide sequence include but is not limited to: (AY693650 from *Oscimum basilicum*) and (AY906866, REGION: 10 . . . 1887 from *Pseudotsuga menziesii*).

In some embodiments, the $C_{10}$ isoprenoid starting materials can be obtained or prepared from naturally occurred terpenes. Terpenes generally include a large and varied class of hydrocarbons, such as hemiterpenes, monoterpenes, sesquiterpenes, diterpenes, sesterterpenes, triterpenes, tetraterpenes, and polyterpenes. Natural terpenes can be produced by a wide variety of plants, such as *Copaifera langsdorfii*, conifers, and spurges; insects, such as swallowtail butterflies, leaf beetles, termites, and pine sawflies; and marine organisms, such as algae, sponges, corals, mollusks and fish.

*Copaifera langsdorfii* or *Copaifera* tree is also known as the diesel tree and kerosene tree. It has many names in local languages, including kupa'y, cabismo, and copaúva. *Copaifera* tree may produce a large amount of terpene hydrocarbons in its wood and leaves. Generally, one *Copaifera* tree can produce from about 30 to about 40 liters of terpene oil per year. The terpene oil can be collected via tapping of the *Copaifera* tree and subsequently used to formulate or produce various fuel compositions, such as diesel, kerosene, and gasoline, by further processing.

The conifers belong to the plant division Pinophyta or Coniferae and are generally cone-bearing seed plants with vascular tissue. The majority of conifers are trees, but some conifers can be shrubs. Some non-limiting examples of suitable conifers include cedars, cypresses, douglas-firs, firs, junipers, kauris, larches, pines, redwoods, spruces, and yews. Terpene oils can be obtained from the conifers and subsequently used to formulate or produce various fuel compositions, such as diesel, kerosene, and gasoline, by further processing.

Spurges, also known as *Euphorbia*, are a very diverse worldwide genus of plants, belonging to the spurge family (Euphorbiaceae). Consisting of about 2160 species, spurges are one of the largest genera in the plant kingdom. The latex or terpene oil of spurges comprises many di- or tri-terpen esters, which can used to formulate or produce various fuel compositions, such as diesel, kerosene, and gasoline, by further processing.

In some embodiments, the terpene oil comprises one or more of hemiterpenes. Hemiterpenes generally comprise a single isoprene unit. Isoprene itself may be considered the only hemiterpene, but oxygen-containing derivatives such as prenol and isovaleric acid are hemiterpenoids.

In certain embodiments, the terpene oil comprises one or more of monoterpenes. Monoterpenes generally comprise two isoprene units and have the molecular formula $C_{10}H_{16}$. Some non-limiting examples of monoterpenes include geraniol and limonene.

In some embodiments, the terpene oil comprises one or more of sesquiterpenes. Sesquiterpenes generally comprise three isoprene units and have the molecular formula $C_{15}H_{24}$. Some non-limiting examples of sesquiterpenes include farnesol.

In certain embodiments, the terpene oil comprises one or more of diterpenes. Diterpenes generally comprise four isoprene units and have the molecular formula $C_{20}H_{32}$. They are generally derived from geranylgeranyl pyrophosphate. Some non-limiting examples of diterpenes include cafestol, kahweol, cembrene and taxadiene (precursor of taxol).

In some embodiments, the terpene oil comprises one or more of sesterterpenes. Sesterterpenes, generally comprising five isoprene units, are rare relative to the other terpenes.

In certain embodiments, the terpene oil comprises one or more of triterpenes. Triterpenes generally comprise six isoprene units and have the molecular formula $C_{30}H_{48}$. The linear triterpene squalene, the major constituent of shark liver oil, can be derived from the reductive coupling of two molecules of farnesyl pyrophosphate.

In some embodiments, the terpene oil comprises one or more of tetraterpenes. Tetraterpenes generally comprise eight isoprene units and have the molecular formula $C_{40}H_{56}$. Some non-limiting examples of tetraterpenes include the acyclic lycopene, the monocyclic gamma-carotene, and the bicyclic alpha- and beta-carotenes.

In certain embodiments, the terpene oil comprises one or more of polyterpenes. Polyterpenes generally comprise two or more isoprene units. In some embodiments, polyterpenes comprise long chains of many isoprene units such as natural rubber. Natural rubber generally comprises polyisoprene in which the double bonds are cis. Some plants may produce a polyisoprene with trans double bonds.

Chemical Conversion

Irrespective of its source, each of the $C_{10}$ isoprenoid starting materials and stereoisomers thereof can be chemically converted into a fuel component disclosed herein by any known reduction reaction.

The catalyst for the hydrogenation reaction of the isoprenoid starting materials or the ring-opening hydrogenation reaction of the bicyclic alkanes disclosed herein can be present in any amount that can cause the reaction to advance by at least about 1%, at least about 2%, at least about 3%, at least about 4%, at least about 5%, at least about 10%, at least about 15%, at least about 20%, at least about 25%, or at least about 30%. The advance of the reaction can be measured as a function of the disappearing of one of the reactants or the formation of one of the products. For example, an 1%, 2%, 3%, 4%, 5%, 10%, 15%, 20%, 25% or 30% of advancement in the reaction refers to a decrease in the amount of one of the reactants by 1%, 2%, 3%, 4%, 5%, 10%, 15%, 20%, 25% or 30% respectively. In some embodiments, the amount of the hydrogenation catalyst is from about 1 g to about 100 g per liter of reactant, from about 2 g to about 75 g per liter of reactant, from about 3 g to about 50 g per liter of reactant, from about 4 g to about 40 g per liter of reactant or from about 5 g to about 30 g per liter of reactant.

The reaction temperature for the hydrogenation reaction of the isoprenoid starting materials or the ring-opening hydrogenation reaction of the bicyclic alkanes disclosed herein can be any temperature that can cause the reaction to advance by at least about 1%, at least about 2%, at least about 3%, at least about 4%, at least about 5%, at least about 10%, at least about 15%, at least about 20%, at least about 25%, or at least about 30%. In some embodiments, the reaction temperature for the hydrogenation reaction of the isoprenoid starting materials is from about 10° C. to about 95° C., from about 15° C. to about 85° C., from about 20° C. to about 75° C., or from about 20° C. to about 50° C. In other embodiments, the reaction temperature for the ring-opening hydrogenation reaction of the bicyclic alkanes disclosed herein is from about 100° C. to about 500° C., from about 150° C. to about 450° C., from about 175° C. to about 400° C., or from about 200° C. to about 350° C.

The pressure of the hydrogen for the hydrogenation reaction of the isoprenoid starting materials or the ring-opening hydrogenation reaction of the bicyclic alkanes disclosed herein can be any pressure that can cause the reaction to advance by at least about 1%, at least about 2%, at least about 3%, at least about 4%, at least about 5%, at least about 10%, at least about 15%, at least about 20%, at least about 25%, or at least about 30%. In some embodiments, the pressure of the hydrogen is from about 200 psi to about 1000 psi, from about 300 psi to about 800 psi, from about 400 psi to about 600 psi, or from about 450 psi to about 550 psi.

The reaction time for the hydrogenation reaction of the isoprenoid starting materials or the ring-opening hydrogenation reaction of the bicyclic alkanes disclosed herein can be any temperature that can cause the reaction to advance by at least about 1%, at least about 2%, at least about 3%, at least about 4%, at least about 5%, at least about 10%, at least about 15%, at least about 20%, at least about 25%, or at least about 30%. In some embodiments, the reaction time is from about 5 minutes to about 24 hours, from about 15 minutes to about 16 hours, from about 30 minutes to about 8 hours, or from about 60 minutes to about 4 hours.

Optionally, the hydrogen for the hydrogenation reaction of the isoprenoid starting materials or the ring-opening hydrogenation reaction of the bicyclic alkanes disclosed herein can occur in a solvent such as an alkane, a cycloalkane or a combination thereof.

Applications of Fuel Compositions

The fuel composition disclosed herein can be stored in or received by a fuel container such as fuel tanks. A fuel tank is generally a safe container for flammable liquids. In some embodiments, the fuel tank is a part of a combustion engine system in which a fuel is stored and propelled by a fuel pump or released in pressurized gas form into a combustion engine. Any fuel tank that can store or receive one or more liquid fuels can be used herein. Some non-limiting examples of suitable fuel containers include vehicle fuel tanks such as automobile fuel tanks and aircraft fuel tank; fuel tanks above ground or in the ground (e.g., at a gas station), tanks on transportation vehicles such as tanker trucks, tanker trains, and tanker ships. In certain embodiments, the fuel tank may be connected to other equipments or devices such as power tools, generators and internal combustion engines.

The fuel tanks may vary in size and complexity from small plastic tanks of a butane lighter to the multi-chambered cryogenic Space Shuttle external tank. The fuel tank may be made of a plastic such as polyethylenes (e.g., HDPE and UHDPE) or a metal such as steel or aluminum.

In some embodiments, the fuel composition disclosed here is stored in an aircraft fuel tank and propelled by a fuel pump or released in pressurized gas form into a internal combustion engine to power an aircraft. The aircraft fuel tank can be an integral fuel tank, rigid removable fuel tank, a bladder fuel tank or a combination thereof.

In certain embodiments, the fuel tank is an integral tank. The integral tank is generally an area inside the aircraft structure that have been sealed to allow fuel storage. An example of this type is the "wet wing" generally used in larger aircraft. Most large transport aircraft generally use the integral tank which stores fuel in the wings and/or tail of the airplane.

In some embodiments, the fuel tank is a rigid removable tank. The rigid removable tank is generally installed in a compartment designed to accommodate the tank. They generally are made of metal, and may be removed for inspection, replacement, or repair. The aircraft does not rely on the tank for structural integrity. These tanks are generally found in smaller general aviation aircrafts.

In certain embodiments, the fuel tank is a bladder tank. The bladder tank is generally reinforced rubberized bags installed in a section of aircraft structure designed to accommodate the weight of the fuel. The bladder tank may be rolled up and installed into the compartment through the fuel filler neck or access panel, and may be secured by means of metal buttons or snaps inside the compartment. The bladder tank is generally found in many high-performance light aircraft and some smaller turboprops.

The fuel composition disclosed herein can be used to power any equipment such as an emergency generator or internal combustion engine, which requires a fuel such as jet fuels or missile fuels. An aspect of the present invention provides a fuel system for providing an internal combustion engine with a fuel wherein the fuel system comprises a fuel tank containing the fuel composition disclosed herein. Optionally, the fuel system may further comprise an engine cooling system having a recirculating engine coolant, a fuel line connecting the fuel tank with the internal combustion engine, and/or a fuel filter arranged on the fuel line. Some non-limiting examples of internal combustion engines include reciprocating engines (e.g., gasoline engines and diesel engines), Wankel engines, jet engines, some rocket engines and gas turbine engines.

In some embodiments, the fuel tank is arranged with said cooling system so as to allow heat transfer from the recirculating engine coolant to the fuel composition contained in the fuel tank. In other embodiments, the fuel system further comprises a second fuel tank containing a second fuel for a gasoline engine and a second fuel line connecting the second fuel tank with the internal combustion engine. Optionally, the first and second fuel lines can be provided with electromagnetically operated valves that can be opened or closed independently of each other or simultaneously. In further embodiments, the second fuel is a gasoline.

Another aspect of the invention provides an engine arrangement comprising an internal combustion engine, a fuel tank containing the fuel composition disclosed herein, a fuel line connecting the fuel tank with the internal combustion engine. Optionally, the engine arrangement may further comprise a fuel filter and/or an engine cooling system comprising a recirculating engine coolant. In some embodiments, the internal combustion engine is a gasoline engine. In other embodiments, the internal combustion engine is a jet engine.

When using the fuel composition disclosed herein, it is desirable to remove particulate matter originating from the fuel composition before injecting it into the engine. Therefore, it is desirable to select a suitable fuel filter for use in the fuel system disclosed herein. Water in fuels used in an internal combustion engine, even in small amounts, can be very harmful to the engine. Therefore, it is desirable that water present in fuel composition can be removed prior to injection into the engine. In some embodiments, water and particulate matter can be removed by the use of a fuel filter utilizing a turbine centrifuge, in which water and particulate matter are separated from the fuel composition to an extent allowing injection of the filtrated fuel composition into the engine, without risk of damage to the engine. Other types of fuel filters that can remove water and/or particulate matter may of course also be used.

Another aspect of the invention provides a vehicle comprising an internal combustion engine, a fuel tank containing the fuel composition disclosed herein, a fuel line connecting the fuel tank with the internal combustion engine. Optionally, the vehicle may further comprise a fuel filter and/or an engine cooling system comprising a recirculating engine coolant. Some non-limiting examples of vehicles include cars, motorcycles, trains, ships, and aircraft.

Another aspect of the invention provides a facility for manufacture of a fuel, bioengineered fuel component or bioengineered fuel additive of the invention. In certain embodiments, the facility is capable of biological manufacture of the $C_{10}$ isoprenoid starting materials. In certain embodiments, the facility is further capable of preparing a substituted cycloalkane fuel component from the isoprenoid starting material.

The facility can comprise any structure useful for preparing the $C_{10}$ isoprenoid starting material using a microorganism. In some embodiments, the biological facility comprises one or more of the cells disclosed herein. In some embodiments, the biological facility comprises a cell culture comprising at least a $C_{10}$ isoprenoid starting material in an amount of at least about 1 wt. %, at least about 5 wt. %, at least about 10 wt. %, at least about 20 wt. %, or at least about 30 wt. %, based on the total weight of the cell culture. In further embodiments, the biological facility comprises a fermentor comprising one or more cells described herein.

Any fermentor that can provide cells or bacteria a stable and optimal environment in which they can grow or reproduce can be used herein. In some embodiments, the fermentor comprises a culture comprising one or more of the cells disclosed herein. In other embodiments, the fermentor comprises a cell culture capable of biologically manufacturing IPP. In further embodiments, the fermentor comprises a cell culture capable of biologically manufacturing DMAPP. In further embodiments, the fermentor comprises a cell culture capable of biologically manufacturing GPP from IPP and DMAPP. In certain embodiments, the fermentor comprises a cell culture comprising at least a $C_{10}$ isoprenoid starting material in an amount of at least about 1 wt. %, at least about 5 wt. %, at least about 10 wt. %, at least about 20 wt. %, or at least about 30 wt. %, based on the total weight of the cell culture.

The facility can further comprise any structure capable of manufacturing the fuel component or fuel additive from the $C_{10}$ isoprenoid starting material. The structure may comprise a hydrogenator for the hydrogenation of the $C_{10}$ isoprenoid starting materials. Any hydrogenator that can be used to reduce a C=C double bond to a C—C single bonds under conditions known to skilled artisans may be used herein. The hydrogenator may comprise a hydrogenation catalyst disclosed herein. In some embodiments, the structure further comprises a mixer, a container and a mixture of the hydrogenation products from the hydrogenation step and a conventional fuel additive in the container.

Business Methods

One aspect of the present invention relates to a business method comprising: (a) obtaining a biofuel comprising at least a substituted cycloalkane derived from a $C_{10}$ isoprenoid starting material by performing a fermentation reaction of a sugar with a recombinant host cell, wherein the recombinant host cell produces the $C_{10}$ isoprenoid starting material; and (b) marketing and/or selling said biofuel.

In other embodiments, the invention provides a method for marketing or distributing the biofuel disclosed herein to marketers, purveyors, and/or users of a fuel, which method comprises advertising and/or offering for sale the biofuel disclosed herein. In further embodiments, the biofuel disclosed herein may have improved physical or marketing characteristics relative to the natural fuel or ethanol-containing biofuel counterpart.

In certain embodiments, the invention provides a method for partnering or collaborating with or licensing an established petroleum oil refiner to blend the biofuel disclosed herein into petroleum-based fuels such as a gasoline, jet fuel, kerosene, diesel fuel or a combination thereof. In another embodiment, the invention provides a method for partnering or collaborating with or licensing an established petroleum oil refiner to process (for example, hydrogenate, hydrocrack, crack, further purify) the biofuels disclosed herein, thereby modifying them in such a way as to confer properties beneficial to the biofuels. The established petroleum oil refiner can use the biofuel disclosed herein as a feedstock for further chemical modification, the end product of which could be used as a fuel or a blending component of a fuel composition.

In further embodiments, the invention provides a method for partnering or collaborating with or licensing a producer of sugar from a renewable resource (for example, corn, sugar cane, bagass, or lignocellulosic material) to utilize such renewable sugar sources for the production of the biofuels disclosed herein. In some embodiments, corn and sugar cane, the traditional sources of sugar, can be used. In other embodiments, inexpensive lignocellulosic material (agricultural waste, corn stover, or biomass crops such as switchgrass and pampas grass) can be used as a source of sugar. Sugar derived from such inexpensive sources can be fed into the production of the biofuel disclosed herein, in accordance with the methods of the present invention.

In certain embodiments, the invention provides a method for partnering or collaborating with or licensing a chemical producer that produces and/or uses sugar from a renewable resource (for example, corn, sugar cane, bagass, or lignocellulosic material) to utilize sugar obtained from a renewable resource for the production of the biofuel disclosed herein.

EXAMPLES

The following examples are intended for illustrative purposes only and do not limit in any way the scope of the present invention.

Example 1

This example describes methods for making expression plasmids that encode enzymes of the MEV pathway from *Saccharomyces cerevisiae* organized in operons, namely the MevT66, MevB, MBI, and MBIS operons.

Expression plasmid pAM36-MevT66, comprising the MevT66 operon, was generated by inserting the MevT66 operon into the pAM36 vector. The MevT66 operon encodes the set of MEV pathway enzymes that together transform the ubiquitous precursor acetyl-CoA to (R)-mevalonate, namely acetoacetyl-CoA thiolase, HMG-CoA synthase, and HMG-CoA reductase. Vector pAM36 was generated by inserting an oligonucleotide cassette containing AscI-SfiI-AsiSI-XhoI-PacI-FsII-PmeI restriction enzyme sites into the pACYC184 vector (GenBank accession number XO6403), and by removing the tet resistance gene in pACYC184. The MevT66 operon was synthetically generated using SEQ ID No:1 as a template. The nucleotide sequence comprises the atoB gene from *Escherichia coli* (GenBank accession number NC_000913 REGION: 2324131 . . . 2325315) codon-optimized for expression in *Escherichia coli* (encodes an acetoacetyl-CoA thiolase), the ERG13 gene from *Saccharomyces cerevisiae* (GenBank accession number X96617, REGION: 220 . . . 1695) codon-optimized for expression in *Escherichia coli* (encodes a HMG-CoA synthase), and a truncated version of the HGM1 gene from *Saccharomyces cerevisiae* (GenBank accession number M22002, REGION: 1777 . . . 3285) codon-optimized for expression in *Escherichia coli* (encodes a truncated HMG-CoA reductase). The synthetically generated MevT66 operon was flanked by a 5' EcoRI and a 3' Hind III restriction enzyme site, and could thus be cloned into compatible restriction enzyme sites of a cloning vector such as a standard pUC or pACYC origin vector. The MevT66 operon was PCR amplified with flanking SfiI and AsiSI restriction enzyme sites, the amplified DNA fragment was digested to completion using SfiI and AsiSI restriction enzymes, the reaction mixture was resolved by gel electrophoresis, the approximately 4.2 kb DNA fragment was extracted, and the isolated DNA fragment was inserted into the SfiI and AsiSI restriction enzyme sites of the pAM36 vector, yielding expression plasmid pAM36-MevT66.

Expression plasmid pAM25, also comprising the MevT66 operon, was generated by inserting the MevT66 operon into the pAM29 vector. Vector pAM29 was created by assembling the p15A origin of replication and kan resistance gene from pZS24-MCS1 (Lutz and Bujard *Nucl Acids Res*. 25:1203-1210 (1997)) with an oligonucleotide-generated lacUV5 promoter. The DNA synthesis construct comprising the MevT66 operon (see above) was digested to completion using EcoRI and Hind III restriction enzymes, the reaction mixture was resolved by gel electrophoresis, the 4.2 kb DNA fragment was extracted using a Qiagen gel purification kit (Valencia, Calif.), and the isolated MevT66 operon fragment was inserted into the EcoRI and HindIII restriction enzyme sites of pAM29, yielding expression plasmid pAM25.

Expression plasmid pMevB-Cm, comprising the MevB operon, was generated by inserting the MevB operon into the pBBR1MCS-1 vector. The MevB operon encodes the set of enzymes that together convert (R)-mevalonate to IPP, namely mevalonate kinase, phosphomevalonate kinase, and mevalonate pyrophosphate carboxylase. The MevB operon was generated by PCR amplifying from *Saccharomyces cerevisiae* genomic DNA the ERG12 gene (GenBank accession number X55875, REGION: 580 . . . 1911) (encodes a mevalonate kinase), the ERG8 gene (GenBank accession number Z49939, REGION: 3363 . . . 4718) (encodes a phosphomevalonate kinase), and the MVD1 gene (GenBank accession number X97557, REGION: 544 . . . 1734) (encodes a mevalonate pyrophosphate carboxylase), and by splicing the genes together using overlap extensions (SOEing). By choosing appropriate primer sequences, the stop codons of ERG12 and ERG8 were changed from TAA to TAG during amplification to introduce ribosome binding sites into the MevB operon. After the addition of 3' A overhangs, the MevB operon was ligated into the TA cloning vector pCR4 (Invitrogen, Carlsbad, Calif.). The MevB operon was excised by digesting the cloning construct to completion using PstI restriction enzyme, resolving the reaction mixture by gel electrophoresis, and extracting the 4.2 kb DNA fragment. The isolated MevB operon fragment was ligated into the PstI restriction enzyme site of vector pBBR1MCS-1 (Kooach et al., *Gene* 166(1): 175-176 (1995)), yielding expression plasmid pMevB-Cm.

Expression plasmid pMBI, comprising the MBI operon, was generated by inserting the MBI operon into the pBBR1MCS-3 vector. The MBI operon encodes the same enzymes as the MevB operon, as well as an isopentenyl pyrophosphatase isomerase that catalyzes the conversion of IPP to DMAPP. The MBI operon was generated by PCR amplifying the idi gene (GenBank accession number AF119715) from *Escherichia coli* genomic DNA using primers that contained an XmaI restriction enzyme site at their 5' ends, digesting the amplified DNA fragment to completion using XmaI restriction enzyme, resolving the reaction mixture by gel electrophoresis, extracting the 0.5 kb fragment, and ligating the isolated DNA fragment into the XmaI restriction enzyme site of expression plasmid pMevB-Cm, thereby placing idi at the 3' end of the MevB operon and yielding the MBI operon. The MBI operon was subcloned into the SalI and SacI restriction enzyme sites of vector pBBR1-MCS-3, yielding expression plasmid pMBI.

Expression plasmid pMBIS, comprising the MBIS operon, was generated by inserting the ispA gene into pMBI. The ispA gene encodes a farnesyl pyrophosphate synthase that catalyzes the conversion of IPP to DMAPP. The ispA gene (GenBank accession number D00694, REGION: 484 . . . 1383) was PCR amplified from *Escherichia coli* genomic DNA using a forward primer with a SacII restriction enzyme site and a reverse primer with a SacI restriction enzyme site. The amplified PCR product was digested to completion with SacII and SacI restriction enzymes, the reaction mixture was resolved by gel electrophoresis, and the 0.9 kb fragment was extracted. The isolated DNA fragment was ligated into the SacII and SacI restriction enzyme sites of pMBI, thereby placing the ispA gene 3' of idi and the MevB operon, and yielding expression plasmid pMBIS.

Expression plasmid pAM45, comprising both the MevT66 operon and the MBIS operon, was generated by inserting the MBIS operon into pAM36-MevT66 and by adding lacUV5 promoters in front of each operon. The MBIS operon was PCR amplified from pMBIS using primers comprising a 5' XhoI and a 3' PacI restriction enzyme site. The amplified PCR product was digested to completion using XhoI and PacI restriction enzymes, the reaction mixture was resolved by gel electrophoresis, the 5.4 kb DNA fragment was extracted, and the isolated DNA fragment was ligated into the XhoI and PacI restriction enzyme sites of pAM36-MevT66, yielding plasmid pAM43. A nucleotide sequence encoding the lacUV5 promoter was then synthesized from oligonucleotides, and sub-cloned into the AscI SfiI and AsiSI XhoI restriction enzyme sites of pAM43, yielding expression plasmid pAM45.

Example 2

This example describes methods for making expression vectors encoding enzymes of the MEV pathway from *Staphylococcus aureus*.

Expression plasmid pAM41 was derived from expression plasmid pAM25 by replacing the HGM1 nucleotide sequence with the mvaA gene. The mvaA gene encodes the *Staphylococcus aureus* HMG-CoA reductase. The mvaA gene (GenBank accession number BA000017, REGION: 2688925 . . . 2687648) was PCR amplified from *Staphyloccoccus aureus* subsp. *aureus* (ATCC 70069) genomic DNA using primers 4-49 mvaA SpeI (SEQ ID No: 2) and 4-49 mvaAR XbaI (SEQ ID No: 3), and the amplified DNA fragment was digested to completion using SpeI restriction enzyme, the reaction mixture was resolved by gel electrophoresis, and the approximately 1.3 kb DNA fragment was extracted. The HMG1 nucleotide sequence was removed from pAM25 by digesting the plasmid to completion with HindIII restriction enzyme. The terminal overhangs of the resulting linear DNA fragment were blunted using T4 DNA polymerase. The DNA fragment was then partially digested using SpeI restriction enzyme, the reaction mixture was resolved by gel electrophoresis, and the 4.8 kb DNA fragment was extracted. The isolated DNA fragment was ligated with the SpeI-digested mvaA PCR product, yielding expression plasmid pAM41.

Expression plasmid pAM52 was derived from expression plasmid pAM41 by replacing the ERG13 nucleotide sequence with the mvaS gene. The mvaS gene encodes the *Staphylococcus aureus* HMG-CoA synthase. The mvaS gene (GenBank accession number BA000017, REGION: 2689180 . . . 2690346) was PCR amplified from *Staphyloccoccus aureus* subsp. *aureus* (ATCC 70069) genomic DNA using primers HMGS 5' Sa mvaS-S (SEQ ID No:4) and HMGS 3' Sa mvaS-AS (SEQ ID No:5), and the amplified DNA fragment was used as a PCR primer to replace the HMG1 gene in pAM41 according to the method of Geiser et al. *BioTechniques* 31:88-92 (2001), yielding expression plasmid pAM52.

Expression plasmid pAM97 was derived from expression plasmid pAM45 by replacing the MevT66 operon with the (atoB(opt):mvaA:mvaS) operon of expression plasmid pAM52. Expression plasmid pAM45 was digested to completion using AsiSI and SfiI restriction enzymes, the reaction mixture was resolved by gel electrophoresis, and the 8.3 kb DNA fragment lacking the MevT66 operon was extracted. The (atoB(opt):mvaA:mvaS) operon of pAM52 was PCR amplified using primers 19-25 atoB SfiI-S (SEQ ID No:6) and 19-25 mvaA-AsiSI-AS (SEQ ID No:7), the PCR product was digested to completion using SfiI and AsiSI restriction enzymes, the reaction mixture was resolved by gel electrophoresis, and the 3.7 kb DNA fragment was extracted. The isolated DNA fragment was ligated into the AsiSI and SfiI restriction enzyme sites of expression plasmid pAM45, yielding expression plasmid pAM97.

Expression plasmid pAM97-gpps is derived from expression plasmid pAM97 by replacing the ispA nucleotide sequence with a nucleotide sequence encoding a geranyl diphosphate synthase ("gpps"). The nucleotide sequence encoding the geranyl diphosphate synthase is generated synthetically, and comprises the coding sequence of the gpps gene of *Arabidopsis thaliana* (GenBank accession number Y17376, REGION: 52 . . . 1320), codon-optimized for expression in *Escherichia coli* (SEQ ID No:8). The coding sequence is flanked by a leader NotI restriction enzyme site and a terminal SacI restriction enzyme site, and can be cloned into compatible restriction enzyme sites of a cloning vector such as a standard pUC or pACYC origin vector. The synthetically generated geranyl diphosphate synthase sequence is isolated by digesting the DNA synthesis construct to completion using NotI and SacI restriction enzymes, resolving the reaction mixture by gel electrophoresis, and extracting the approximately 1.3 kb DNA fragment. Expression plasmid pAM97 is digested to completion using NotI and SacI restriction enzymes, the reaction mixture is resolved by gel electrophoresis, the approximately 11.2 kb DNA fragment is extracted, and the isolated DNA fragment is ligated with the DNA fragment comprising the nucleotide sequence encoding geranyl diphosphate synthase, yielding expression plasmid pAM97-gpps.

Example 3

This example describes the generation of *Escherichia coli* host strains for the production of α-pinene, γ-terpinene, and terpinolene. Host strains were created by transforming chemically competent *Escherichia coli* DH1 cells with expression plasmids pMevT, pMBIS-gpps, and one of the following: pTrc99A-APS, pTrc99A-GTS, and pTrc99A-TS.

Figure 4:
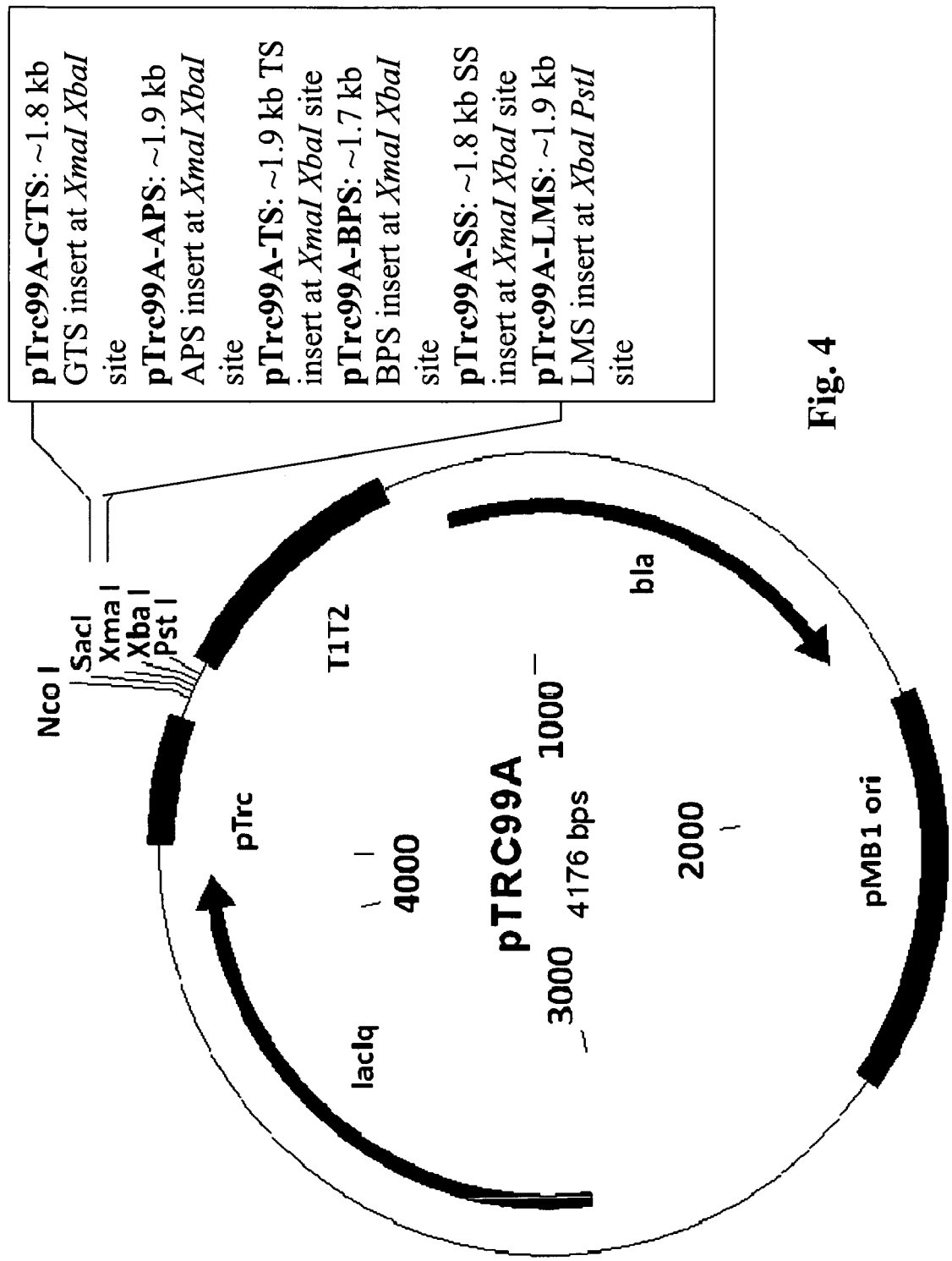
FIG. 4 is a schematic representation of plasmid maps of expression plasmids pTrc99A-APS, pTrc99A-GTS, pTrc99A-TS, pTrc99A-BPS, pTrc99A-SS and pTrc99A-LMS.

Expression plasmids pTrc99A-APS, pTrc99A-GTS, and pTrc99A-TS were generated by inserting a nucleotide sequence encoding an α-pinene synthase ("APS"), a γ-terpinene synthase ("GTS"), or a terpinolene synthase ("TS") into the pTrc99A vector. The nucleotide sequence insert was generated synthetically, using as a template the coding sequence of the α-pinene synthase gene of *Pinus taeda* (GenBank accession number AF543530 REGION: 1 . . . 1887), the coding sequence of a γ-terpinene synthase gene of *Citrus limon* (GenBank accession number AF514286 REGION: 30 . . . 1832), or the coding sequence of the terpinolene synthase gene of *Ocimum basilicum* (GenBank accession number AY693650) or of *Pseudotsuga menziesii* (GenBank accession number AY906866 REGION: 10 . . . 1887), all nucleotide sequences being codon-optimized for expression in *Escherichia coli*. (The codon-optimized nucleotide sequences of the α-pinene, γ-terpinene, and terpinolene synthases are shown as SEQ ID Nos:9 through 12). The coding sequences were flanked by a leader XbaI restriction enzyme site and a terminal XbaI restriction enzyme site. The synthetic nucleic acids were cloned into compatible restriction enzyme sites of a cloning vector such as a standard pUC or pACYC origin vector, from which they could be liberated again by digesting the DNA synthesis construct to completion using XbaI and XmaI restriction enzymes, resolving the reaction mixture by gel electrophoresis, and gel extracting the approximately 1.8 to 1.9 terpene synthase encoding DNA fragment. The isolated DNA fragment was ligated into the XbaI XmaI restriction enzyme site of vector pTrc99A (Amman et al., *Gene* 40:183-190 (1985)), yielding expression plasmids pTrc99A-APS, pTrc99A-GTS, or pTrc99A-TS (see FIG. 4 for plasmid maps).

Host cell transformants were selected LB agar containing 100 ug/mL carbenicillin, 34 ug/mL chloramphenicol, and 5 ug/mL tetracycline. Single colonies were transferred from LB agar to culture tubes containing 5 mL of LB liquid medium and antibiotics as detailed above. The cultures were incubated by shaking at 37° C. until growth reached late exponential phase. The cells were stored at −80° C. in cryo-vials in 1 mL frozen aliquots made up of 400 uL 50% glycerol and 600 uL liquid culture.

Example 4

This example describes the generation of *Escherichia coli* host strains for the production of D-limonene, β-pinene, and sabinine. Host strains are created by transforming chemically competent *Escherichia coli* DH1 cells with expression plasmids pMevT, pMBIS-gpps, and one of the following: pTrc99A-LMS, pTrc99A-BPS, and pTrc99A-SS.

Expression plasmids pTrc99A-LMS, pTrc99A-BPS, and pTrc99A-SS are generated by inserting a nucleotide sequence encoding a D-limonene synthase ("LMS"), β-pinene synthase ("BPS"), or sabinine synthase ("SS") into the pTrc99A vector. The nucleotide sequence inserts are generated synthetically, using as a template for example the coding sequence of the D-limonene synthase gene of *Abies grandis* (GenBank accession number AF006193 REGION: 73 . . . 1986), the coding sequence of the β-pinene synthase of *Artemisia annua* (GenBank accession number AF276072 REGION: 1 . . . 1749), or the coding sequence of the sabinine synthase gene of *Salvia officinalis* (GenBank accession number AF051901 REGION: 26 . . . 1798). The nucleotide sequences encoding the β-pinene and sabinine synthases are flanked by a leader XmaI restriction enzyme site and a terminal XbaI restriction enzyme site, and the nucleotide sequence encoding the D-limonene synthase is flanked by a leader NcoI restriction enzyme site and a terminal PstI restriction enzyme site. The DNA synthesis constructs are digested to completion using XmaI and XbaI (for the β-pinene and sabinine synthase constructs), or NcoI and PstI restriction enzymes (for the D-limonene synthase construct). The reaction mixtures are resolved by gel electrophoresis, the approximately 1.7 to 1.9 kb DNA fragments are gel extracted, and the isolated DNA fragments are ligated into the XmaI XbaI restriction enzyme site (for the β-pinene and sabinine synthase inserts), or the NcoI PstI restriction enzyme site (for the D-limonene synthase insert) of the pTrc99A vector, yielding expression plasmids pTrc99A-LMS, pTrc99A-BPS, and pTrc99A-SS (see FIG. 4 for plasmid maps).

Host cell transformants are selected LB agar containing 100 ug/mL carbenicillin, 34 ug/mL chloramphenicol, and 5 ug/mL tetracycline. Single colonies are transferred from LB agar to culture tubes containing 5 mL of LB liquid medium and antibiotics as detailed above. The cultures are incubated by shaking at 37° C. until growth reaches late exponential phase. The cells are stored at −80° C. in cryo-vials in 1 mL frozen aliquots made up of 400 uL 50% glycerol and 600 uL liquid culture.

Example 5

This example describes the production of α-pinene, γ-terpinene, terpinolene, D-limonene, β-pinene, and sabinine in an *Escherichia coli* host strain of Examples 4 or 5.

Seed cultures are grown overnight by adding the 1 mL stock aliquot to a 125 mL flask containing 25 mL M9-MOPS-0.5% Yeast Extract, 2% glucose, 100 ug/mL carbenicillin, 34 ug/mL chloramphenicol, and 5 ug/mL tetracycline. The cultures are used to inoculate 250 mL baffled flasks containing 40 mL M9-MOPS-0.5% Yeast Extract, 2% glucose, and antibiotics as detailed above at an initial $OD_{600}$ of approximately 0.05. Cultures are incubated by shaking at 30° C. on a rotary shaker at 250 rpm until they reach an $OD_{600}$ of 0.2, at which point the production of the compound of interest in the host cells is induced with 1 mM IPTG (40 uL of 1M IPTG added to the culture medium). The compound of interest is separated from the culture medium through solvent-solvent extraction, or by settling and decantation if the titer of the compound of interest is large enough to saturate the media and to form a second phase.

Example 6

This example describes the generation of *Saccharomyces cerevisiae* host strains for the production of α-pinene, γ-terpinene, terpinolene, D-limonene, β-pinene, and sabinine. Host strains are generated by first generating a *Saccharomyces cerevisiae* strain that produces elevated levels of geranyl pyrophosphate, and then transforming the strain with expression plasmid pRS425-APS, pR425-BPS, pR425-GTS, pR425-TS, pR425-LMS, pR425-BPS, or pR425-SS.

The generation of host strain EPY219 is described in Ro et al. (*Nature* 440: 940-943; 2006) and in PCT Patent Publication WO2007/005604. Host strain EPY219 is cured of expression plasmid pRS425ADS by growth in YPD medium (Methods in Yeast Genetics: A Cold Spring Harbor Laboratory Course Manual, 2005 ed., ISBN 0-87969-728-8), plating for single colonies on YPD agar, and then patching single colonies onto CSM-Met-His agar and CSM-Met-HisLeu agar. Clones that grow on CSM-Met-His agar but not on CSM-Met-His-Leu agar are cured (i.e., have lost the plasmid pRS425ADS). One such clone is then transformed with plasmid pδ-gpps. Plasmid pδ-gpps is generated by inserting a synthetically generated nucleotide sequence comprising the coding sequence of the gpps gene of *Arabidopsis thaliana* (GenBank accession number Y17376, REGION: 52 . . . 1320) into vector pRS-SacII-DX (Ro et al. *Nature* 440: 940-943; 2006), digesting the resulting plasmid using SacII restriction enzyme, gel extracting the expression cassette fragment, and cloning the isolated fragment into the SacII restriction enzyme site of pδ-UB. Transformants are initially selected on SD-URA-HIS-MET plates, and then cultured and plated on SD-HIS-MET plates including 1 g $L^{-1}$ 5-FOA for the construction of a *Saccharomyces cerevisiae* strain that produces elevated levels of geranyl pyrophosphate.

Expression plasmids pRS425-APS, pR425-GTS, pR425-TS, pR425-BPS, pR425-LMS, pR425-BPS, and pR425-SS are generated by inserting a nucleotide sequence encoding an α-pinene synthase ("APS"), γ-terpinene synthase ("GTS"), terpinolene synthase ("TS"), D-limonene synthase ("LMS"), β-pinene synthase ("BPS"), or sabinine synthase ("SS") into the pRS425-Gal1 vector (Mumberg et. al. (1994) *Nucl. Acids. Res.* 22(25): 5767-5768). The nucleotide sequence insert is generated synthetically, using as a template for example the coding sequence of the α-pinene synthase gene of *Pinus taeda* (GenBank accession number AF543530 REGION: 1 . . . 1887), the coding sequence of a γ-terpinene synthase gene of *Citrus limon* (GenBank accession number AF514286 REGION: 30 . . . 1832), the coding sequence of the terpinolene synthase gene of *Ocimum basilicum* (GenBank accession number AY693650) or of *Pseudotsuga menziesii* (GenBank accession number AY906866 REGION: 10 . . . 1887), the coding sequence of the D-limonene synthase gene of *Abies grandis* (GenBank accession number AF006193 REGION: 73 . . . 1986), the coding sequence of the β-pinene synthase of *Artemisia annua* (GenBank accession number AF276072 REGION: 1 . . . 1749), or the coding sequence of the sabinine synthase gene of *Salvia officinalis* (GenBank accession number AF051901 REGION: 26 . . . 1798). The synthetically generated nucleotide sequence is flanked by a leader BamHI site and a terminal XhoI site, and can thus be cloned into compatible restriction enzyme sites of a cloning vector such as a standard pUC or pACYC origin vector. The synthetically generated nucleotide sequence is isolated by digesting the DNA synthesis construct using BamHI and XhoI restriction enzymes (partial digest for the α-pinene and γ-terpinene synthase constructs, complete digests for all other constructs), the reaction mixture is resolved by gel electrophoresis, the approximately 1.7 to 1.9 kb DNA fragment comprising the terpene synthase coding sequence is gel extracted, and the isolated DNA fragment is ligated into the BamHI XhoI restriction enzyme site of the pRS425-Gal1 vector, yielding expression plasmid pRS425-APS, pR425-GTS, pR425-TS, pR425-BPS, pR425-LMS, pR425-BPS, or pR425-SS.

Host cell transformants are selected on synthetic defined media, containing 2% glucose and all amino acids except leucine (SM-glu). Single colonies are transferred to culture vials containing 5 mL of liquid SM-glu lacking leucine. The cultures are incubated by shaking at 30° C. until growth reaches stationary phase. The cells are stored at −80° C. in cryo-vials in 1 mL frozen aliquots made up of 400 μL 50% glycerol and 600 μL liquid culture.

Example 7

This example describes the production of α-pinene, γ-terpinene, terpinolene, D-limonene, β-pinene, and sabinine in a *Saccharomyces cerevisiae* host strain of Example 6.

Seed flasks are grown overnight by adding the 1 mL stock aliquot to 25 mL of SM-glu lacking leucine in a 125 mL flask. The cultures are used to inoculate 250 mL baffled flasks containing 40 mL of synthetic defined media lacking leucine, 0.2% glucose, and 1.8% galactose at an initial $OD_{600}$ of approximately 0.05. The cultures are incubated by shaking at 30° C. on a rotary shaker at 200 rpm. Because the presence of glucose in the media prevents induction of the Gal1 promoter by galactose, production of the compound of interest is not induced until the cells use up the glucose in the media and switch to using galactose as their main carbon source. The compound of interest is separated from the media through solvent-solvent extraction, or by settling and decantation if the titer of the compound of interest is large enough to saturate the media and form a second phase.

Example 8

A design of experiments (DOE) methodology was used to test six catalysts. Three factors were tested: catalyst type, temperature, and catalyst loading. The catalysts used for the hydrogenation screen were: 5% rhodium on activated carbon from Alfa Aesar stock #11761, 5% ruthenium on carbon from Alfa Aesar stock #L00524, 5% platinum on carbon from Alfa Aesar stock #L00566, platinum oxide from Sigma-Aldrich stock #206032, 5% palladium on carbon dry from Alfa Aesar stock #A12623, and nickel on silica-alumina from Alfa Aesar stock #31276. This DOE resulted in 12 experiments, to which were added 3 center points using Platinum on carbon. The catalyst loadings were normalized to mmol/L of the metal, which took into account the different molecular weights and percentages of metal per gram of catalyst. The catalyst loading was varied from 1.3 mmol/L to 6.5 mmol/L, while the temperature was varied from 200° C. to 300° C.

All hydrogenation experiments were carried out in 75 mL Parr pressure reactors with 20 mL starting material (48.869% cis-pinane, 50.137% trans-pinane). Experiments were conducted in the following manner: starting material was added to the reactor, followed by the specified amount of catalyst. The reactor was then charged with 200 psi of hydrogen, stirred, and heated to the desired temperature. At this point, the reactor was re-charged with 600 psi of hydrogen. All reactions were monitored by computer and re-charged to 600 psi as needed, allowing the reactions to drop at least 100 psi before re-charging. Each experiment was run for four days, or until it stopped taking up hydrogen for at least 6 hours. The products were analyzed by GC/MS and mass spectra were compared against the NIST database for identification. Chromatograms were then integrated to get product distribution. No further purification was attempted.

Of the six catalysts tested, rhodium on carbon and ruthenium on carbon showed strong selectivity towards tetramethylcyclohexane at 200° C. Due to the positive result of the ruthenium on carbon catalyst, two more experiments were attempted, one at 150° C., and one at 250° C., as well as a repeat of the initial experiment. The reaction showed activity at both temperatures. However the experiment at 150° C. did not go to completion over the course of two days, although all of the cis-pinane was consumed leaving only trans-pinane. Some of the higher temperature runs, at 250° C. and above, showed multiple unidentified products, two of which were later identified as trimethylcyclohexane and ethyl-methylcyclohexane. At 300° C., palladium, platinum, and ruthenium on carbon yielded both isomers of p- and o-cymene, as well. Overall, the highest selectivity and conversion to product came from the two ruthenium on carbon experiments, one of which yielded 91.9% total tetramethylcyclohexanes, and the other yielded 92.7%. Rhodium on carbon yielded 86.3% total tetramethylcyclohexane, however it was unable to convert a significant amount of starting material, and also produced more p- and o-menthanes than other experiments. Taking the average of the two ruthenium runs at 200° C., one obtains a product ratio of approximately 32:1 in favor of tetramethylcyclohexane over all other known products, as compared to 21:1 for the best rhodium run. The conversion for the Ruthenium processes at 200° C. was approximately 99.5%. The results of the DOE experiment are shown in Table 1.

In Table 1, Comps. 1 & 2 refer to tetramethylcyclohexane compounds (1) and (2); Comps. 14 & 17 refer to menthane compounds (14) and (17); Comp. 11 refers to aromatic compound (11); Comp. 27 refers to dimethyloctane (27); and Comp. 24 refers to pinane compound (24).

TABLE 1

| Expt. | Catalyst | Temp (° C.) | Cat. Loading (mmol/L) | Products[#] (wt. %) | | | | |
|---|---|---|---|---|---|---|---|---|
| | | | | Comps. 1 & 2 | Comps. 14 & 17 | Comp. 11 | Comp. 27 | Comp. 24 |
| 1 | Pd/C | 300 | 1.3 | 31.635 | 26.606 | 0.551 | 16.098 | 15.688 |
| 2 | Pd/C | 200 | 6.5 | 54.248 | 4.017 | 0 | 0 | 35.659 |
| 3 | Ru/C | 300 | 1.3 | 41.348 | 16.171 | 5.023 | 14.841 | 9.473 |
| 4 | Ru/C | 200 | 6.5 | 91.894 | 1.151 | 0 | 0.117 | 0.496 |
| 5 | PtO2 | 200 | 1.3 | 0.123 | 0 | 0 | 0 | 99.085 |
| 6 | PtO2 | 300 | 6.5 | 3.404 | 11.678 | 0 | 24.495 | 54.116 |
| 7 | Ni/SiAl | 200 | 1.3 | 4.476 | 0.646 | 0 | 0 | 88.258 |
| 8 | Ni/SiAl | 300 | 6.5 | 33.798 | 21.24 | 0 | 6.38 | 18.724 |
| 9 | Rh/C | 200 | 1.3 | 86.335 | 3.55 | 0 | 0.074 | 7.053 |
| 10 | Rh/C | 300 | 6.5 | 38.405 | 18.185 | 0 | 13.384 | 28.62 |
| 11 | Pt/C | 300 | 1.3 | 8.831 | 4.934 | 17.159 | 19.173 | 38.207 |
| 12 | Pt/C | 200 | 6.5 | 0.281 | 0.023 | 0 | 0.045 | 98.581 |
| 13 | Pt/C | 250 | 3.9 | 0.159 | 0.398 | 0 | 1.641 | 96.861 |
| 14 | Pt/C | 250 | 3.9 | 0.361 | 0.491 | 0 | 2.128 | 95.903 |
| 15 | Pt/C | 250 | 3.9 | 0.348 | 0.235 | 0 | 1.059 | 97.25 |
| 16 | Ru/C | 200 | 6.5 | 92.685 | 3.064 | 0 | 0.2 | 0.416 |
| 17 | Ru/C | 250 | 6.5 | 91.782 | 0 | 0 | 0.254 | 0.624 |
| 18 | Ru/C | 150 | 6.5 | 41.295 | 4.085 | 0 | 0 | 51.939 |

Example 9

A composition designated as AMG-500 was made by hydrogenating pinane to tetramethylcyclohexane using 5% ruthenium on carbon at 200° C. These conditions resulted in a 92% product yield. The product composition of AM-500 was determined to be: i) 52% cis-1,1,2,3-tetramethylcyclohexane; ii) 8% trans-1,1,2,3-tetramethylcyclohexane; iii) 32% 1,1,2,5-tetramethylcyclohexane; iv) 3% menthane; v) and 0.4% trans-pinane. The 1,1,2,5-tetramethylcyclohexane had two isomers; one at 28% and the other at 4% but could not determine which was the cis or trans isomer. Similarly, the methane had two isomers; one at 2% and the other at 1% but could not determine which was the p-menthane or the o-menthane.

AMG-500 and blends of AMG-500 in CARBOB were tested in various ASTM tests and the results are summarized in Tables 2 and 3 below.

TABLE 2

| Property | ASTM Test Method | Units | Unleaded Gasoline ASTM D4814 Specification | CARBOB 0 | AMG-500/CARBOB Blend (vol. % AMG-500 in CARBOB) 5 | 20 | 50 | AMG-500 100 |
|---|---|---|---|---|---|---|---|---|
| Ocatane Number, Research (RON) | D2699 | — | | 88.4 | 88.7 | 89.3 | 90.7 | 94.7 |
| Ocatane Number, Motor (MON) | D2700 | — | | 81.6 | 81.9 | 82.5 | 84.7 | 87.9 |
| Anti Knock Index, (R + M)/2 | | — | | 85.0 | 85.3 | 85.9 | 87.7 | 91.3 |
| Calc. Blending RON | | — | | | 94.4 | 92.9 | 93.0 | |
| Calc. Blending MON | | — | | | 87.6 | 86.1 | 87.8 | |
| Calc. Blending Anti Knock Index | | — | | | 91.0 | 89.5 | 90.4 | |
| Vapor Pressure (CARB Equation) | D5191 | psi | max. 7.8-15.0* | 5.70 | 5.47 | 4.77 | 3.26 | 0.06 |
| Vapor Pressure (EPA Equation) | D5191 | psi | max. 7.8-15.0* | 5.81 | 5.57 | 4.89 | 3.40 | 0.22 |
| Vapor Pressure (ASTM Equation) | D5191 | psi | max. 7.8-15.0* | 5.95 | 5.72 | 5.04 | 3.56 | 0.41 |
| Calc. Blending Vapor Pressure (CARB) | | psi | | | 1.1 | 1.1 | 0.8 | |
| Calc. Blending Vapor Pressure (EPA) | | psi | | | 1.0 | 1.2 | 1.0 | |
| Calc. Blending Vapor Pressure (ASTM) | | psi | | | 1.4 | 1.4 | 1.2 | |
| Distillation | | | | | | | | |
| Initial Boiling Point (Evaporated) | D86 | °F. | max. 122-158* | 107 | 109 | 112 | 119 | 313 |
| 10% (Evaporated) | D86 | °F. | min. 150-170* | 146 | 148 | 154 | 184 | 316 |
| 50% (Evaporated) | D86 | °F. | max. 230-250* | 215 | 222 | 247 | 299 | 321 |
| 90% (Evaporated) | D86 | °F. | max. 365-374* | 322 | 325 | 328 | 328 | 323 |
| Final Boiling Point (Evaporated) | D86 | °F. | max. 437 | 389 | 389 | 378 | 376 | 360 |
| Residue | D86 | vol. % | max. 2.0 | 1.3 | 1.1 | 1.4 | 0.9 | 0.8 |
| Vapor-Liquid Ratio Temperature (V/L = 20) | D5188 | °F. | min. 95-140* | 162.0 | 165.9 | >176.0 | >176.0 | >176.0 |
| Driveability Index | | | max. 1200-1250* | 1185 | 1213 | 1299 | 1502 | 1760 |

TABLE 3

| Property | ASTM Test Method | Units | Unleaded Gasoline ASTM D4814 Specification | CARBOB 0 | AMG-500/CARBOB Blend (vol. % AMG-500 in CARBOB) 5 | 20 | 50 | AMG-500 100 |
|---|---|---|---|---|---|---|---|---|
| Density @ 0 15.0° C. (59.0° F.) | D4052 | g/cm³ | | 0.7421 | 0.7456 | 0.7522 | 0.7740 | 0.8044 |
| Heat of Combustion, Gross | D4809 | BTU/lb | | 20,026 | 19,819 | 19,964 | 20,110 | 19,906 |
| Energy Content (HHV) | | BTU/gal | | 124,027 | 123,324 | 125,326 | 129,901 | 133,634 |
| Copper Corrosion | D130 | | max. No. 1 | 1a | 1a | 1a | 1a | 1a |
| Silver Corrosion | D4814A | | max. 1 | 0 | 0 | 0 | 0 | 0 |
| Oxidation Stability | | | | | | | | |
| Induction Period @ 100.0° C. | D525 | min. | 240 | >240 | >240 | >240 | >240 | >240 |
| Total Potential Residue | D873 | mg/100 mL | max. 6.0 | 1.3 | 1.3 | 1.4 | 1.5 | 1.8 |
| Gum Content, Unwashed | D381 | mg/100 mL | | 0.5 | 0.5 | 1.0 | 1.0 | 2.0 |
| Gum Content, Washed | D381 | mg/100 mL | max. 5.0 | 0.0 | 0.0 | 0.0 | 0.5 | 1.0 |
| Sulfur | D5453 | ppm | max. 30 | 12 | 11 | 8.8 | 4.9 | <1 |
| Phosphorous | D3231 | g P/gal | max. 0.005 | <0.0008 | <0.0008 | <0.0008 | 0.0008 | 0.0013 |
| Lead (Pb) | D3237 | g Pb/gal | max. 0.05 | <0.02 | <0.02 | <0.02 | <0.02 | <0.02 |
| Benzene | D5580 | vol. % | max. 1.0 | 0.61 | 0.58 | 0.50 | 0.32 | <0.01 |
| Total Aromatics | D5580 | vol. % | max. 25 | 24.26 | 22.91 | 19.44 | 12.33 | 0.06 |
| Total Olefins | D6550 | vol. % | max. 6.0 | 5.9/5.0 | 5.4/4.7 | 4.3/3.7 | 2.8/2.4 | <1 |
| ***** Add 10% ethanol and run tests below | | | | | | | | |
| Water Tolerance, Phase Separation | D6422 | °C. | max. −41-10* | <−24 | <−24 | <−24 | <−24 | <−24 |
| Dry Vapor Pressure Equivalent (CARB) | D5191 | psi | max. 7.8-15.0* | 7.01 | 6.60 | 5.98 | 4.66 | 1.93 |
| Calc. Blending Vapor Pressure (CARB) | | psi | | | −1.2 | 1.9 | 2.3 | |

Figure 5:
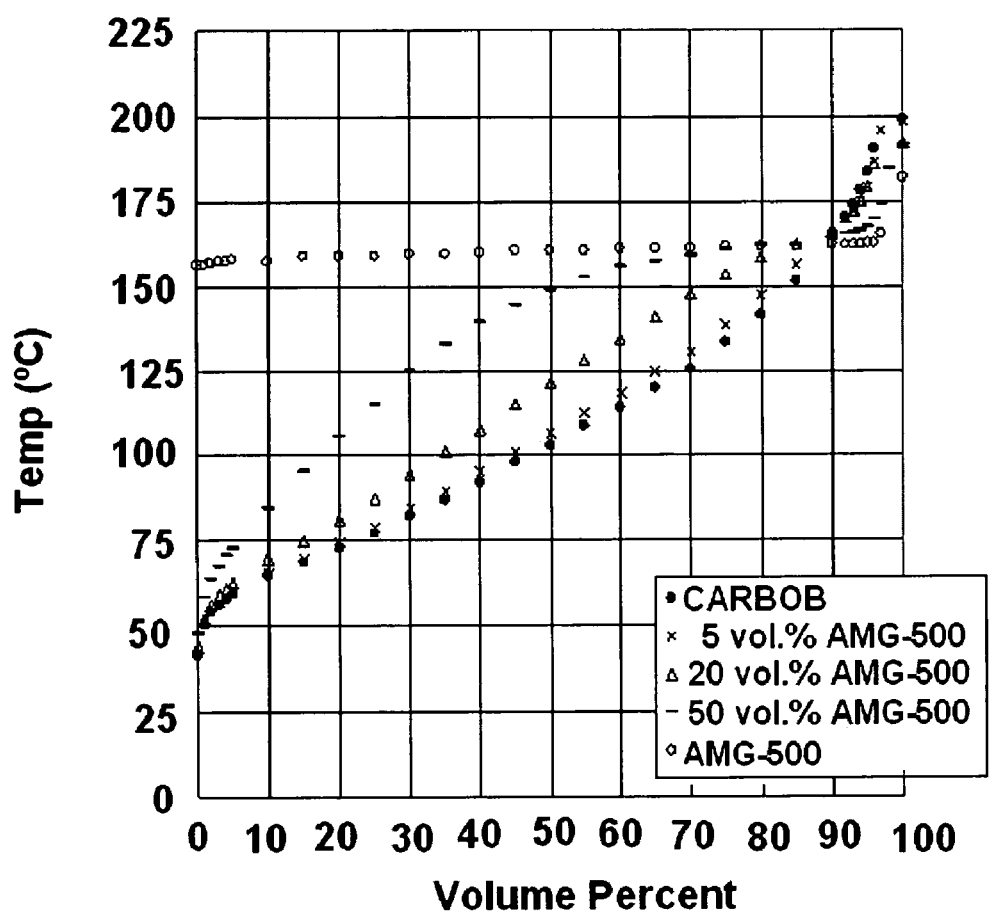
FIGS. 5A and 5B show the distillation profiles of AMG-500 and various blends of AMG-500 in CARBOB respectively.
Figure 5:
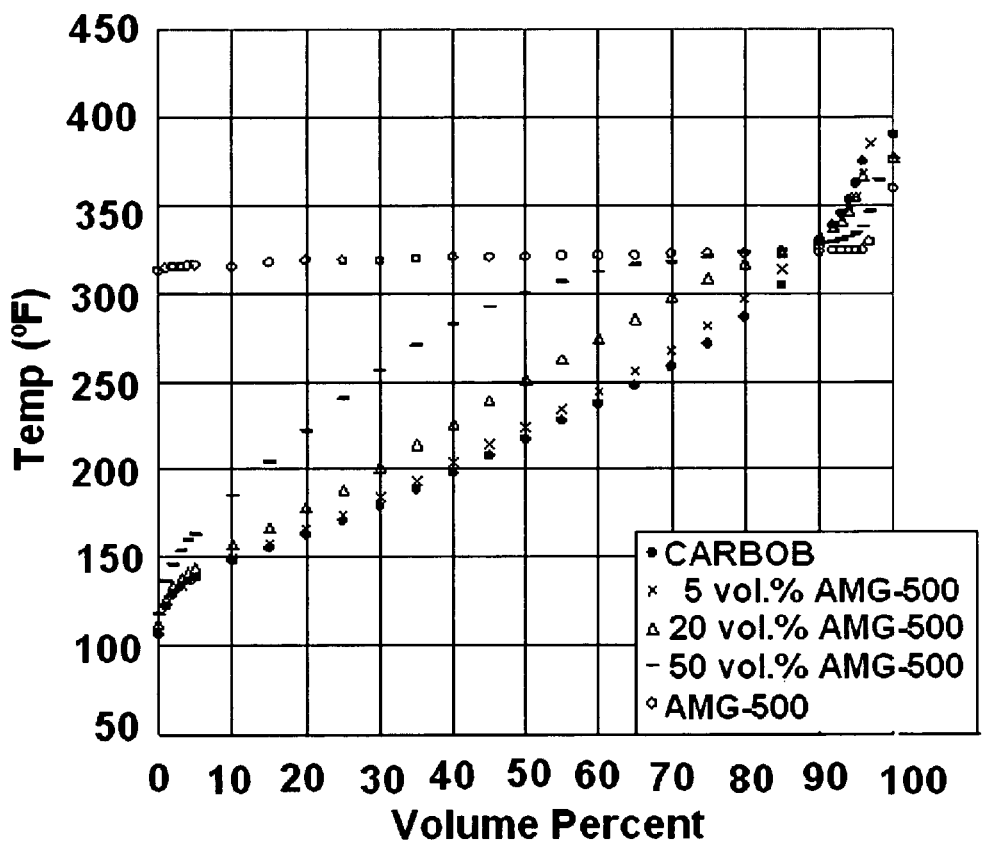

FIGS. 5A and 5B show the distillation profile of AMG-500 and blends of AMG-500 in CARBOB respectively.

The fuel composition disclosed herein can be produced in a cost-effective and environmentally friendly manner. Advantageously, the isoprenoid compounds provided herein can be produced by one or more microorganisms. These isoprenoid compounds can thus provide a renewable source of energy as a substitute for petroleum-based fuel such as gasoline. Further, these isoprenoid compounds can decrease dependence on non-renewable sources of fuel, fuel components and/or fuel additives. In certain embodiments, the present invention encompasses a fuel composition comprising a bioengineered tetramethylcyclohexane.

As demonstrated above, embodiments of the invention provide various fuel compositions which are particularly useful as jet fuels or missile fuels. While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. For example, the jet fuel compositions disclosed herein need not comprising at least a tetramethylcyclohexane. It can comprise any type of hydrocarbons generally suitable for jet fuel applications. It should be noted that the application of the fuel compositions disclosed herein is not limited to gasoline engines; they can be used in any equipment which requires gasoline. Although there are specifications for most gasoline compositions, not all gasoline compositions disclosed herein need to meet all requirements in the specifications. It is noted that the methods for making and using the fuel compositions disclosed herein are described with reference to a number of steps. These steps can be practiced in any sequence. One or more steps may be omitted or combined but still achieve substantially the same results. The appended claims intend to cover all such variations and modifications as falling within the scope of the invention.

All publications and patent applications mentioned in this specification are herein incorporated by reference to the same extent as if each individual publication or patent application was specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A fuel composition comprising:
   (a) a tetramethylcyclohexane having a quaternary carbon atom in the cyclohexane ring in an amount of at least 5 wt. %, based on the total weight of the fuel composition; and
   (b) a fuel component.

2. The fuel composition of claim 1, wherein the tetramethylcyclohexane is

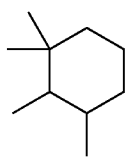

(1)

or at least one stereoisomer thereof.

3. The fuel composition of claim 1, wherein the tetramethylcyclohexane is

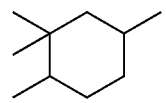

(2)

or at least one stereoisomer thereof.

4. The fuel composition of claim 1, wherein the fuel component is a petroleum-based fuel component.

5. The fuel composition of claim 4, wherein the petroleum-based fuel component is gasoline.

6. The fuel composition of claim 4, wherein the petroleum-based fuel component is jet fuel.

7. The fuel composition of claim 4, wherein the petroleum-based fuel component is kerosene.

8. The fuel composition of claim 1, wherein the fuel component is a coal-based fuel component.

9. The fuel composition of claim 1 further comprising a fuel additive.

10. The fuel composition of claim 9, the fuel additive is selected from the group consisting of oxygenates, antioxidants, thermal stability improvers, cetane improvers, stabilizers, cold flow improvers, combustion improvers, anti-foams, anti-haze additives, corrosion inhibitors, lubricity improvers, icing inhibitors, injector cleanliness additives, smoke suppressants, drag reducing additives, metal deactivators, dispersants, detergents, demulsifiers, dyes, markers, static dissipaters, biocides and combinations thereof.

11. The fuel composition of claim 1, wherein the amount of the tetramethylcyclohexane is at most about 30 wt. %, based on the total weight of the fuel composition.

12. The fuel composition of claim 1, wherein the amount of the tetramethylcyclohexane is at most about 20 wt. %, based on the total weight of the fuel composition.

13. The fuel composition of claim 1, wherein the amount of the tetramethylcyclohexane is at most about 10 wt. %, based on the total weight of the fuel composition.

14. The fuel composition of claim 1 comprising:

(a)

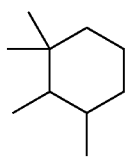
(1)

or at least one stereoisomer thereof;

(b)

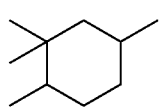
(2)

or at least one stereoisomer thereof;

(c)

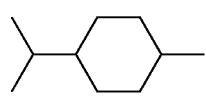
(14)

or at least one stereoisomer thereof; and (d)

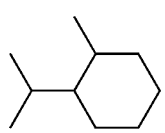
(17)

or at least one stereoisomer thereof, wherein the total amount of (a) and (b) is from about 1 wt. % to about 99 wt. %, and the total amount of (c) and (d) is from 0.5 wt. % to about 50 wt. %, based on the total weight of (a)-(d).

15. The fuel composition of claim 14 further comprising:

(e)

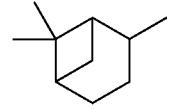
(24)

or at least one stereoisomer thereof;

(f)

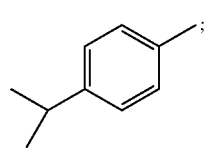
(11)

and (g)

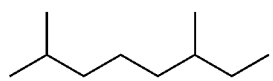
(27)

or at least one stereoisomer thereof; wherein the amount of (e) is from 0 wt. % to about 50 wt. %, the amount of (0 is from about 0.1 wt. % to about 20 wt. %, and the amount of (g) is from about 0.1 wt. % to about 30 wt. %, based on the total weight of (a)-(g).

16. The fuel composition of claim 15, wherein the total amount of (a) and (b) is from about 50 wt. % to about 99 wt. %, based on the total weight of (a)-(g).

17. The fuel composition of claim 15, wherein the total amount of (a) and (b) is from about 80 wt. % to about 99 wt. %, based on the total weight of (a)-(g).

18. The fuel composition of claim 15, wherein the total amount of (c) and (d) is less than about 10 wt. %, based on the total weight of (a)-(g).

19. The fuel composition of claim 1 that is an RBOB, CARBOB or AZ RBOB.

20. The fuel composition of claim 1 that has a Reid vapor pressure between 7.0 psi and 15.0 psi.

21. A method of making a fuel composition comprising contacting pinene with hydrogen in the presence of a hydrogenation catalyst to form at least a tetramethylcyclohexane.

22. The method of claim 21, wherein the pinene is α-pinene, β-pinene or a combination thereof.

23. The method of claim 21, wherein the hydrogenation catalyst comprises a ruthenium catalyst.

24. The method of claim 23, wherein the ruthenium catalyst is ruthenium on a support material.

25. The method of claim 24, wherein the support material is carbon.

26. The method of claim 21, further comprising the step of mixing the tetramethylcyclohexane with a fuel component to make the fuel composition.

27. The method of claim 26, wherein the fuel component is a petroleum-based fuel component.

28. The method of claim 27, wherein the petroleum-based fuel component is gasoline.

29. The method of claim 27, wherein the petroleum-based fuel component is jet fuel.

30. The method of claim 27, wherein the petroleum-based fuel component is kerosene.

31. A vehicle comprising an internal combustion engine; a fuel tank connected to the internal combustion engine; and a fuel composition in the fuel tank, wherein the fuel composition comprises at least 5 wt. % of a tetramethylcyclohexane having a quaternary carbon atom in the cyclohexane ring, based on the total weight of the fuel composition, and a fuel component, and wherein the fuel composition is used to power the internal combustion engine.

32. The vehicle of claim 31, wherein the internal combustion engine is a gasoline engine.

33. The vehicle of claim 31, wherein the tetramethylcyclohexane is

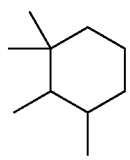

(1)

or at least one stereoisomer thereof.

34. The vehicle of claim 31, wherein the tetramethylcyclohexane is

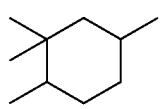

(2)

or at least one stereoisomer thereof.

35. A vehicle comprising an internal combustion engine; a fuel tank connected to the internal combustion engine; and a fuel composition in the fuel tank, wherein the fuel composition is prepared by contacting pinene with hydrogen in the presence of a hydrogenation catalyst, and wherein the fuel composition is used to power the internal combustion engine.

36. The vehicle of claim 35, wherein the pinene is α-pinene, β-pinene or a combination thereof.

37. The vehicle of claim 35, wherein the internal combustion engine is a gasoline engine.

38. A method of making a fuel composition comprising:
   (a) contacting a cell capable of making pinene with a sugar under conditions suitable for making pinene;
   (b) converting the pinene to pinane;
   (c) converting the pinane to at least a tetramethylcyclohexane; and
   (d) mixing the tetramethylcyclohexane with a fuel component to make the fuel composition.

39. The method of claim 38, wherein the pinene is converted to pinane by hydrogen in the presence of a first hydrogenation catalyst.

40. The method of claim 38, wherein the pinane is converted to tetramethylcyclohexane by hydrogen in the presence of a second hydrogenation catalyst.

41. A method of making an RBOB comprising mixing a gasoline with a fuel composition comprising a tetramethylcyclohexane having a quaternary carbon atom in the cyclohexane ring, wherein the RBOB has a Reid vapor pressure from about 7.0 psi to about 15.0 psi, and wherein the amount of the tetramethylcyclohexane is from about 1 wt. % to about 50 wt. %, based on the total weight of the fuel composition.

42. The method of claim 41, wherein the tetramethylcyclohexane is

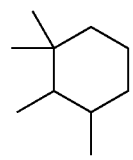

(1)

or at least one stereoisomer thereof.

43. The method of claim 41, wherein the tetramethylcyclohexane is

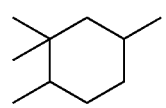

(2)

or at least one stereoisomer thereof.

44. A fuel tank containing a fuel composition, wherein the fuel composition comprises at least 5 wt. % of a tetramethylcyclohexane having a quaternary carbon atom in the cyclohexane ring, based on the total weight of the fuel composition, and a fuel component.

45. The fuel tank of claim 44, wherein the tetramethylcyclohexane is

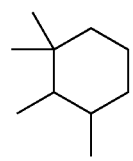

(1)

or at least one stereoisomer thereof.

46. The fuel tank of claim 44, wherein the tetramethylcyclohexane is

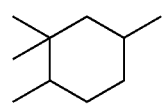

(2)

or at least one stereoisomer thereof.

47. The fuel tank of claim 44, wherein the fuel tank is a vehicle fuel tank.

48. A fuel composition comprising a gasoline and at least one tetramethylcyclohexane having a quaternary carbon atom in the cyclohexane ring, wherein the amount of the tetramethylcyclohexane is from about 1 wt. % to about 50 wt. %, based on the total weight of the fuel composition.

49. The fuel composition of claim 48, wherein the tetramethylcyclohexane is

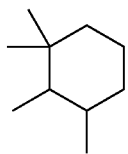

or at least one stereoisomer thereof.

50. The fuel composition of claim 48, wherein the tetramethylcyclohexane is

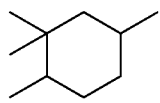

or at least one stereoisomer thereof.

51. The fuel composition of claim 50 further comprising a fuel additive.

52. The fuel composition of claim 51, the fuel additive is selected from the group consisting of oxygenates, antioxidants, thermal stability improvers, cetane improvers, stabilizers, cold flow improvers, combustion improvers, anti-foams, anti-haze additives, corrosion inhibitors, lubricity improvers, icing inhibitors, injector cleanliness additives, smoke suppressants, drag reducing additives, metal deactivators, dispersants, detergents, demulsifiers, dyes, markers, static dissipaters, biocides and combinations thereof.

* * * * *

UNITED STATES PATENT AND TRADEMARK OFFICE
CERTIFICATE OF CORRECTION

| | | |
|---|---|---|
| PATENT NO. | : 7,806,944 B2 | Page 1 of 1 |
| APPLICATION NO. | : 12/175465 | |
| DATED | : October 5, 2010 | |
| INVENTOR(S) | : Ryder et al. | |

It is certified that error appears in the above-identified patent and that said Letters Patent is hereby corrected as shown below:

Column 72, line 34, change "(0" to --(f)--.

Signed and Sealed this
Third Day of May, 2011

David J. Kappos
*Director of the United States Patent and Trademark Office*